(12) United States Patent
Masuda et al.

(10) Patent No.: US 10,358,022 B2
(45) Date of Patent: Jul. 23, 2019

(54) VEHICLE HAVING A GENERATOR WITH INDUCTANCE-ADJUSTABLE WINDINGS

(71) Applicant: YAMAHA HATSUDOKI KABUSHIKI KAISHA, Iwata-shi, Shizuoka (JP)

(72) Inventors: Masafumi Masuda, Iwata (JP); Haruyoshi Hino, Iwata (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 36 days.

(21) Appl. No.: 15/604,228

(22) Filed: May 24, 2017

(65) Prior Publication Data

US 2017/0253233 A1 Sep. 7, 2017

Related U.S. Application Data

(63) Continuation-in-part of application No. PCT/JP2015/082933, filed on Nov. 24, 2015.

(30) Foreign Application Priority Data

Nov. 25, 2014 (JP) ................. 2014-237372
Oct. 2, 2015 (JP) ................. 2015-196667
(Continued)

(51) Int. Cl.
*B60K 1/02* (2006.01)
*B60K 1/00* (2006.01)
(Continued)

(52) U.S. Cl.
CPC ................. *B60K 1/02* (2013.01); *B60K 1/00* (2013.01); *B60K 6/20* (2013.01); *B60K 6/26* (2013.01);
(Continued)

(58) Field of Classification Search
CPC ... B60K 1/02; B60K 1/00; B60K 6/20; B60K 6/26; B60K 6/24; B60K 6/34; B60K 6/46;
(Continued)

(56) References Cited

U.S. PATENT DOCUMENTS 3,229,138 A 1/1966 Kober
5,763,977 A 6/1998 Shimasaki et al.
(Continued)

FOREIGN PATENT DOCUMENTS

CN 1762086 A 4/2006
CN 1836962 A 9/2006
(Continued)

*Primary Examiner* — Charles Reid, Jr.
(74) *Attorney, Agent, or Firm* — Rabin & Berdo, P.C.

(57) ABSTRACT

A vehicle including an engine, a generator, a motor, a driving member and a control device. The generator includes a rotor, a stator having a stator core with a winding wound thereon, and an inductance adjustment device that changes an inductance of the winding by changing magnetic resistance of a magnetic circuit for the winding that passes through the stator core. The current adjustment device adjusts a current outputted from the generator to the motor, which drives the driving member. The control device, upon receiving a request for increasing the current to be supplied to the motor, directs the inductance adjustment device to adjust the generator to operate in a state in which the inductance of the winding is low, directs the engine to increase a rotation speed thereof to increase the rotational power, and directs the current adjustment device to increase the output current of the generator.

22 Claims, 11 Drawing Sheets

(30) Foreign Application Priority Data

| Oct. 2, 2015 | (JP) | 2015-196668 |
|---|---|---|
| Oct. 2, 2015 | (JP) | 2015-196669 |
| Oct. 2, 2015 | (JP) | 2015-196670 |

(51) Int. Cl.

| *B60K 6/20* | (2007.10) |
|---|---|
| *B60K 6/26* | (2007.10) |
| *B60K 6/24* | (2007.10) |
| *B60K 6/48* | (2007.10) |
| *B60K 6/34* | (2007.10) |
| *B60K 6/46* | (2007.10) |
| *B60L 50/10* | (2019.01) |
| *B60L 50/13* | (2019.01) |
| *B60L 50/14* | (2019.01) |
| *B60L 50/61* | (2019.01) |
| *B60W 20/50* | (2016.01) |
| *B60W 20/19* | (2016.01) |
| *B60W 20/00* | (2016.01) |
| *B60W 10/06* | (2006.01) |
| *B60W 10/08* | (2006.01) |
| *H02K 21/24* | (2006.01) |
| *H02K 21/02* | (2006.01) |
| *H02K 1/27* | (2006.01) |
| *H02K 7/18* | (2006.01) |
| *H02K 7/00* | (2006.01) |
| *H02P 9/04* | (2006.01) |
| *H02P 9/40* | (2006.01) |
| *H02P 9/14* | (2006.01) |
| *H02P 27/06* | (2006.01) |
| *H02M 7/44* | (2006.01) |
| *G07C 5/00* | (2006.01) |
| *G07C 5/08* | (2006.01) |
| *B60L 11/08* | (2006.01) |
| *H02P 101/45* | (2016.01) |
| *H02P 101/25* | (2016.01) |

(52) U.S. Cl.
CPC .............. *B60L 11/08* (2013.01); *B60L 50/10* (2019.02); *B60L 50/13* (2019.02); *B60L 50/14* (2019.02); *B60L 50/61* (2019.02); *B60W 10/06* (2013.01); *B60W 10/08* (2013.01); *B60W 20/00* (2013.01); *B60W 20/19* (2016.01); *B60W 20/50* (2013.01); *G07C 5/006* (2013.01); *G07C 5/008* (2013.01); *G07C 5/0825* (2013.01); *H02K 1/27* (2013.01); *H02K 7/006* (2013.01); *H02K 7/1815* (2013.01); *H02K 21/021* (2013.01); *H02K 21/026* (2013.01); *H02K 21/028* (2013.01); *H02K 21/24* (2013.01); *H02M 7/44* (2013.01); *H02P 9/04* (2013.01); *H02P 9/14* (2013.01); *H02P 9/40* (2013.01); *B60K 6/24* (2013.01); *B60K 6/34* (2013.01); *B60K 6/46* (2013.01); *B60K 6/48* (2013.01); *B60K 2001/001* (2013.01); *B60L 2220/14* (2013.01); *B60L 2220/50* (2013.01); *B60L 2240/429* (2013.01); *B60W 2300/365* (2013.01); *B60W 2510/083* (2013.01); *B60W 2520/105* (2013.01); *B60W 2710/0644* (2013.01); *B60W 2710/08* (2013.01); *B60W 2710/083* (2013.01); *B60W 2720/106* (2013.01); *B60Y 2200/92* (2013.01); *H02P 27/06* (2013.01); *H02P 2101/25* (2015.01); *H02P 2101/45* (2015.01); *Y02T 10/6217* (2013.01); *Y02T 10/641* (2013.01); *Y02T 10/642* (2013.01); *Y02T 10/7005* (2013.01); *Y02T 10/7077* (2013.01); *Y10S 903/905* (2013.01); *Y10S 903/906* (2013.01); *Y10S 903/93* (2013.01)

(58) Field of Classification Search
CPC ... B60K 6/48; B60K 2001/001; B60W 20/19; B60W 10/06; B60W 10/08; B60W 20/00; B60W 20/50; B60W 2300/365; B60W 2510/083; B60W 2520/105; B60W 2710/0644; B60W 2710/08; B60W 2710/083; B60W 2720/106; B60L 11/02; B60L 11/08; B60L 11/10; B60L 11/123; B60L 2220/14; B60L 2220/50; B60L 2240/429; B60L 2240/365; G07C 5/006; G07C 5/008; G07C 5/0825; H02K 1/27; H02K 7/006; H02K 7/1815; H02K 21/021; H02K 21/026; H02K 21/028; H02K 21/24; H02M 7/44; H02P 9/04; H02P 9/14; H02P 9/40; H02P 2101/25; H02P 2101/45; H02P 27/06; B60Y 2200/92; Y02T 10/6217; Y02T 10/641; Y02T 10/642; Y02T 10/7005; Y02T 10/7077; Y10S 903/905; Y10S 903/906; Y10S 903/93

USPC ........................................... 290/10
See application file for complete search history.

(56) References Cited

U.S. PATENT DOCUMENTS

| 6,057,622 | A | 5/2000 | Hsu | |
|---|---|---|---|---|
| 6,072,258 | A | 6/2000 | Lamb | |
| 6,943,531 | B2* | 9/2005 | Fukaya | ................. F01L 13/085 307/46 |
| 7,064,454 | B2* | 6/2006 | Fukaya | ................... F02B 63/04 290/1 A |
| 7,204,011 | B2 | 4/2007 | Maslov | |
| 8,288,982 | B2 | 10/2012 | Kauppi | |
| 8,761,981 | B2 | 6/2014 | Hussain et al. | |
| 2002/0170757 | A1 | 11/2002 | Kitada et al. | |
| 2002/0193923 | A1 | 12/2002 | Toyama et al. | |
| 2006/0152104 | A1 | 7/2006 | Hino et al. | |
| 2007/0029887 | A1 | 2/2007 | Murota et al. | |
| 2007/0096581 | A1 | 5/2007 | Zepp et al. | |
| 2007/0227792 | A1 | 10/2007 | Yonemori et al. | |
| 2009/0134723 | A1 | 5/2009 | Takeuchi | |
| 2009/0206602 | A1 | 8/2009 | Nakamura et al. | |
| 2009/0212728 | A1 | 8/2009 | Yagi et al. | |
| 2010/0131139 | A1 | 5/2010 | Sakai et al. | |
| 2011/0121676 | A1 | 5/2011 | Zhu et al. | |
| 2011/0133592 | A1 | 6/2011 | Hino et al. | |
| 2011/0202219 | A1 | 8/2011 | Ishibashi | |
| 2011/0246010 | A1 | 10/2011 | de la Torre Bueno | |
| 2012/0126740 | A1 | 5/2012 | Kauppi | |
| 2012/0197472 | A1 | 8/2012 | He et al. | |
| 2013/0096745 | A1 | 4/2013 | Hussain et al. | |
| 2013/0127244 | A1 | 5/2013 | Handa | |

FOREIGN PATENT DOCUMENTS

| CN | 103503277 A | 1/2014 |
|---|---|---|
| EP | 1132251 A1 | 9/2001 |
| EP | 1-615-319 A1 | 1/2006 |
| EP | 1-705-784 A2 | 9/2006 |
| EP | 1-859-985 A2 | 11/2007 |
| JP | 2002-345109 A | 11/2002 |
| JP | 2003-306183 A | 10/2003 |
| JP | 2006-271040 A | 10/2006 |
| JP | 2007-195334 A | 8/2007 |
| JP | 2008-048519 A | 2/2008 |
| JP | 2008-285011 A | 11/2008 |
| JP | 2009-195051 A | 8/2009 |
| JP | 2009-225656 A | 10/2009 |

(56) References Cited

FOREIGN PATENT DOCUMENTS

| | | |
|---|---|---|
| JP | 2011-092008 A | 5/2011 |
| JP | 2012-044792 A | 3/2012 |
| JP | 2013-180645 A | 9/2013 |
| JP | 2014-084034 A | 5/2014 |
| JP | 2014-108673 A | 6/2014 |
| TW | M358746 U | 6/2009 |
| TW | I345539 B | 7/2011 |
| TW | M421259 U | 1/2012 |
| TW | M421388 U | 1/2012 |
| TW | 2013-15627 A | 4/2013 |
| TW | I401858 B | 7/2013 |
| WO | WO 2014-054069 A1 | 4/2014 |

\* cited by examiner

VEHICLE HAVING A GENERATOR WITH INDUCTANCE-ADJUSTABLE WINDINGS

CROSS-REFERENCE TO RELATED APPLICATIONS

This is a continuation-in-part application of International Application PCT/JP2015/082933, filed on Nov. 24, 2015, which is based on, and claims priority to, Japanese Patent Application No. 2014-237372, filed on Nov. 25, 2014, and Japanese Patent Application Nos. 2015-196667, 2015-196668, 2015-196669 and 2015-196670, all filed on Oct. 2, 2015, the contents of which are incorporated herein by reference.

TECHNICAL FIELD

The present invention relates to a vehicle.

BACKGROUND ART

For example, Japanese Patent Application Laid-Open No. 2002-345109 ("JPA'109") shows a vehicle. The vehicle shown in JPA'109 is a hybrid vehicle. This vehicle includes an engine, an accelerator pedal, a first rotary electric machine, a second rotary electric machine, and a drive wheel. The first rotary electric machine is coupled to an output shaft of the engine. The first rotary electric machine functions mainly as a generator. The second rotary electric machine is electrically connected to the first rotary electric machine via an inverter. The second rotary electric machine functions mainly as a motor. By a current flowing in the first rotary electric machine and the second rotary electric machine, power running is performed. The second rotary electric machine is coupled to the drive wheel of the vehicle. The second rotary electric machine generates a vehicle driving force.

In the vehicle as shown in JPA'109, a depression of the accelerator pedal depressed by a driver represents a request for acceleration of the vehicle. The vehicle as shown in JPA'109 is, if provided with an electronic-controlled throttle device, able to optionally adjust the amount of air taken in by the engine. The vehicle is, therefore, controlled in the following manner, for example. A target output of the second rotary electric machine (motor) is determined based on the vehicle speed and the amount of depression of the accelerator pedal depressed by the driver. A target electric power to be generated by the first rotary electric machine (generator) is determined in accordance with the target output of the second rotary electric machine. A target output of the engine is determined in accordance with the target electric power to be generated. The amount of air taken in and the amount of fuel injected by the engine are controlled so as to achieve the target output. In this control, the first rotary electric machine is controlled in its generating electric power and the second rotary electric machine is controlled in its output. In a case where the vehicle as shown in JPA'109 is configured with its accelerator pedal mechanically coupled with its engine throttle, the electric power generated by the first rotary electric machine and the output of the second rotary electric machine are controlled in accordance with an actual output of the engine. In JPA'109, as described above, electric power (output) of the rotary electric machine is controlled so as to allow applications to various types of vehicles with different characteristics.

BRIEF SUMMARY OF THE INVENTION

In the vehicle as shown in JPA'109, for example, to increase a current to be supplied to the second rotary electric machine serving as the motor, a control is performed so as to increase the amount of air taken in and the amount of fuel injected by the engine. As the amount of air taken in and the amount of fuel injected by the engine increase, rotational power of the engine increases. The rotational power of the engine is converted into electric power by the generator. The electric power generated by the generator is supplied to the motor via the inverter. As the electric power supplied to the motor increases, rotational power of the drive wheel increases.

An increase of the rotation speed of the engine is not exclusively in accordance with the rotational power of the engine. The rotation speed of the engine changes in accordance with a difference between the engine torque for driving the generator and the load torque of the generator. For example, when the engine torque is higher than the load torque of the generator, the rotation speed of the engine increases. To the contrary, when the engine torque is lower than the load torque of the generator, the rotation speed of the engine decreases.

The load torque of the generator depends on a current outputted from the generator. For example, in a case of requiring acceleration of the vehicle, an increase of the current outputted from the generator is requested. Increasing the current outputted from the generator in response thereto causes an increase of the load torque of the generator. This tends to suppress an increase of the rotation speed of the engine. As a result, a prolonged time is required to increase the current supplied from the generator to the motor. That is, acceleration performance of the vehicle decreases.

It is conceivable to control the current outputted from the generator by using the inverter. In controlling the current, the current changes depending on a request and the state of output. The current flows in a circuit including the generator. While the current is changed over time under control, an excessive change of the current relative to a control target is likely to occur because of response characteristics of the circuit. As the current excessively changes and increases, the load torque of the generator increases. If a sufficient engine torque is not ensured relative to the increased load torque of the generator, a prolonged time is required to increase the rotation speed of the engine. As a result, a prolonged time is required to increase the electric power supplied from the generator to the motor. That is, the acceleration performance deteriorates. Moreover, the excessive increase of the load torque of the generator may impair the stability of engine rotation.

A vehicle capable of improving acceleration performance with stabilization of engine rotation has been demanded.

The present invention provides a vehicle capable of improving acceleration performance with stabilized rotation of the engine.

In the various embodiments, the present invention adopts the following configurations:

(1) A vehicle comprising:

an engine that outputs rotational power, the engine including an engine output adjustment device that adjusts the rotational power;

a generator connected to the engine and configured to output electric power according to rotational power transmitted from the engine, the generator including a rotor, a stator, and an inductance adjustment device, the rotor including a permanent magnet, the rotor rotated by the rotational power transmitted from the engine, the stator arranged opposite to the rotor, the stator including a winding and a stator core with the winding wound thereon, the inductance adjustment device configured to change an inductance of the winding by changing a magnetic resistance of a magnetic circuit for the winding, which passes through the stator core;

a motor that is supplied with a current from the generator without interposition of a battery;

a current adjustment device arranged between the generator and the motor, the current adjustment device configured to adjust the current outputted from the generator to the motor;

a driving member that drives the vehicle, the driving member driven by the motor without receiving rotational power from the engine; and a control device that receives a request concerning the current to be supplied to the motor, and controls the engine output adjustment device, the inductance adjustment device, and the current adjustment device in accordance with the received request, the control device configured to direct the inductance adjustment device to adjust the generator between a state in which the magnetic resistance of the magnetic circuit for the winding, which passes through the stator core, is relatively high so that the inductance of the winding is low and a state in which the magnetic resistance of the magnetic circuit for the winding, which passes through the stator core, is relatively low so that the inductance of the winding is high, the control device configured to, upon receiving a request for increasing the current to be supplied to the motor, direct the inductance adjustment device to adjust the generator into the state in which the magnetic resistance of the magnetic circuit for the winding, which passes through the stator core, is relatively high so that the inductance is low, direct the engine output adjustment device to adjust the rotational power of the engine so as to increase the rotational power of the engine to a level higher than when the request for increasing the current was received, and direct the current adjustment device to adjust an output current of the generator so as to increase the rotation speed of the engine and increase the output current of the generator.

In the vehicle of (1), the control device receives the request concerning the current that is to be supplied to the motor. The vehicle is driven by the driving member. The driving member is driven by the motor without receiving rotational power from the engine. The motor receives a current supply from the generator without interposition of a battery. In the vehicle of (1), therefore, a request for increasing the current reflects a request for accelerating the vehicle.

The engine output adjustment device adjusts the rotational power of the engine. An output torque of the engine is adjusted accordingly. The rotation speed of the engine depends on the output torque of the engine and a load torque of the generator. The current adjustment device adjusts the current flowing from the generator to the motor. Since the current outputted from the generator is adjusted, the load torque of the generator is adjusted. As a result, the rotation speed of the engine is adjusted. To be specific, upon receiving a request for increasing the current, the control device directs the engine output adjustment device to adjust the rotational power of the engine so as to increase the rotational power of the engine to a level higher than when the request for increasing the current was received. The control device also directs the current adjustment device to adjust the current outputted from the generator so as to increase the rotation speed of the engine and increase the current outputted from the generator.

In the vehicle of (1), the control device directs the inductance adjustment device to adjust the generator into the state in which the magnetic resistance of the magnetic circuit for the winding, which passes through the stator core, is relatively high so that the inductance is low. In this state, the control device directs the current adjustment device to adjust the current outputted from the generator. Since the inductance of the winding is low, the current is changed with a high responsiveness when the current adjustment device adjusts the current flowing from the generator to the motor. This can suppress occurrence of an excessive change of the current which otherwise might be caused by transient characteristics attributable to the inductance while the current is changing due to the adjustment made by the current adjustment device. Thus, an excessive increase of the torque of the generator can be suppressed. This enables the rotation speed of the engine to be increased in a short time with stabilized rotation of the engine. That is, the current to be outputted from the generator to the motor can be increased in a short time. Accordingly, the vehicle of (1) is able to improve acceleration performance with stabilized rotation of the engine.

(2) A vehicle of (1), wherein after the request for increasing the current is received and while the rotation speed of the engine is higher than the rotation speed of the engine obtained when the request for increasing the current was received, the control device directs the inductance adjustment device to adjust the generator into the state in which the magnetic resistance of the magnetic circuit for the winding, which passes through the stator core, is relatively low so that the inductance is high.

In general, torque characteristics of an engine peak at a certain rotation speed. As the rotation speed increases from a low level, the output torque of the engine increases toward the peak torque. That is, the higher the rotation speed of the engine is, the higher the output torque of the engine is.

In the configuration of (2), while the rotation speed of the engine is higher than the rotation speed of the engine obtained when the request for increasing the current was received, the state is adjusted into the state in which the magnetic resistance of the magnetic circuit for the winding, which passes through the stator core, is relatively low so that the inductance is high. Since the rotation speed of the engine is higher than the rotation speed obtained when the request for increasing the current was received, the output torque of the engine is also high. In this state, a variation of the rotation speed of the engine can be suppressed even if the load torque of the generator largely varies due to the high inductance. Accordingly, the current supplied from the generator to the motor can be increased by the high rotation speed, with stabilized rotation of the engine.

(3) The vehicle of (1) or (2), wherein the current adjustment device includes a switching element, and adjusts a current flowing from the generator to the motor by on/off operation of the switching element.

The current flowing from the generator to the motor is adjusted by on/off operation of the switching element. The current flowing in the winding has transient characteristics, which are attributable to the inductance of the winding, with respect to on/off operation of the switching element, too. If the change of the current is largely delayed by the transient characteristics, the efficiency of the electric power supplied from the generator to the motor decreases. In the vehicle of (3), upon reception of the request for increasing the current, the generator is adjusted into the state in which the magnetic resistance of the magnetic circuit for the winding, which passes through the stator core, is relatively high so that the inductance is low. Since the inductance is low, the transient characteristics, which are attributable to the inductance of the winding, are reduced. Accordingly, the current can be supplied from the generator to the motor with a high efficiency in response to the request for increasing the current.

(4) The vehicle of any one of (1) to (3), wherein the magnetic circuit for the winding, which passes through the stator core, includes at least one non-magnetic gap, and the inductance adjustment device changes the inductance of the winding by changing a magnetic resistance of a non-magnetic gap being among the at least one non-magnetic gap, the non-magnetic gap existing between the winding and the rotor.

In the configuration of (4), the inductance adjustment device changes the inductance of the winding by changing the magnetic resistance of the non-magnetic gap existing between the winding and the rotor. The permanent magnet moving along with rotation of the rotor causes an alternating magnetic field to occur between the winding and the rotor. For example, reducing the magnetic resistance of the non-magnetic gap existing between the winding and the rotor leads to a reduction of an alternating magnetic field loss. This enables the current to be supplied from the generator to the motor.

(5) The vehicle of any one of (1) to (4), wherein the magnetic circuit for the winding, which passes through the stator core, includes at least one non-magnetic gap, and the inductance adjustment device changes the inductance of the winding by changing a magnetic resistance of a non-magnetic gap being among the at least one non-magnetic gap, the non-magnetic gap whose magnetic resistance being highest when the inductance of the winding is set to the highest settable value.

The configuration of (5) changes the magnetic resistance of the non-magnetic gap whose magnetic resistance is highest when the inductance of the winding is set to the highest settable value. This makes it easy to increase the amount of change of the inductance of the winding.

(6) The vehicle of any one of (1) to (5), wherein the inductance adjustment device changes the inductance of the winding such that the change rate of a magnetic flux linked with the winding is lower than the change rate of the inductance of the winding, the change implemented by changing the magnetic resistance of the magnetic circuit for the winding, which passes through the stator core.

In the configuration of (6), the inductance adjustment device changes the inductance of the winding such that the change rate of the magnetic flux linked with the winding is lower than the change rate of the inductance of the winding. The magnetic flux linked with the winding has a direct influence on a voltage generated. The configuration of (6) is able to change the inductance of the winding while suppressing a change of the voltage. The configuration of (6) is able to increase the rotation speed of the engine in a short time with stabilized rotation of the engine.

(7) The vehicle of any one of (1) to (6), wherein the inductance adjustment device changes the inductance of the winding by changing the magnetic resistance of the magnetic circuit for the winding, which passes through the stator core, the change of the magnetic resistance implemented by moving the position of at least a portion of the stator core relative to the winding in accordance with a control performed by the control device.

In the configuration of (7), the inductance adjustment device changes the magnetic resistance of the magnetic circuit for the winding, which passes through the stator core, the change implemented by moving the position of at least a portion of the stator core relative to the winding. The inductance of the winding can be changed easily. This enables the current to be changed with an increased responsiveness when the current adjustment device adjusts the current flowing from the generator to the motor.

(8) The vehicle of (7), wherein the inductance adjustment device changes the inductance of the winding by changing the magnetic resistance of the magnetic circuit for the winding, which passes through the stator core, the change of the magnetic resistance implemented by moving the position of the stator core relative to the winding while maintaining the position of the stator core relative to the rotor in accordance with a control performed by the control device.

The configuration of (8) moves the position of the stator core relative to the winding while maintaining the position of the stator core relative to the rotor. This can suppress a change of the magnetic flux that flows from the permanent magnet of the rotor to the stator core. That is, a change of the magnetic flux generated by the permanent magnet and linked with the winding is suppressed. As a result, a change of the voltage is suppressed which otherwise might be caused by movement of the position of the stator core relative to the winding. The configuration of (8) is able to suppress a variation of the output voltage in a case of lowering the inductance. Accordingly, while the responsiveness of the current change is increased by the lowering of the inductance, a reduction of the output voltage of the generator can be suppressed.

(9) The vehicle of any one of (1) to (7), wherein the inductance adjustment device changes the inductance of the winding by changing the magnetic resistance of the magnetic circuit for the winding, which passes through the stator core, the change of the magnetic resistance implemented by moving the winding.

The configuration of (9) moves the position of the winding relative to the stator core while maintaining the position of the stator core relative to the rotor. This can suppress a change of the magnetic flux that flows from the permanent magnet of the rotor to the stator core. That is, a change of the magnetic flux generated by the permanent magnet and linked with the winding is suppressed. As a result, a change of the voltage is suppressed which otherwise might be caused by movement of the position of the stator core relative to the winding. The configuration of (9) is able to suppress a variation of the output voltage in a case of lowering the inductance. Accordingly, while the responsiveness of the current change is increased by the lowering of the inductance, a reduction of the output voltage of the generator can be suppressed.

(10) The vehicle of any one of (1) to (7), wherein the stator core includes a plurality of first stator core parts and a second stator core part, each of the plurality of first stator core parts having a facing portion that is opposite to the rotor with a non-magnetic gap therebetween, the second stator core part not having the facing portion, and the inductance adjustment device changes the magnetic resistance of the magnetic circuit for the winding, which passes through the stator core, the change implemented by moving one of the plurality of first stator core parts and the second stator core part relative to the other.

In the configuration of (10), the inductance adjustment device moves one of the plurality of first stator core parts and the second stator core part included in the stator core relative to the other. Such a configuration provides a larger change of the magnetic resistance of the magnetic circuit for the winding, which passes through the stator core, as compared with a configuration in which, for example, one of the stator core and a member different from the stator core is moved relative to the other. Accordingly, the inductance can be adjusted over a wider range.

(11) The vehicle of (10), wherein
the inductance adjustment device changes the magnetic resistance of the magnetic circuit for the winding, which passes through the stator core, the change implemented by moving one of the plurality of first stator core parts and the second stator core part relative to the other so as to shift from a first state to a second state, the first state being a state in which the length of a non-magnetic gap between each of the plurality of first stator core parts and the second stator core part is shorter than the length of a non-magnetic gap between adjacent ones of the plurality of first stator core parts, the second state being a state in which the length of the non-magnetic gap between each of the plurality of first stator core parts and the second stator core part is longer than the length of the non-magnetic gap between adjacent ones of the plurality of first stator core parts.

In the configuration of (11), in the first state, the length of the non-magnetic gap between each of the plurality of first stator core parts and the second stator core part is shorter than the length of the non-magnetic gap between adjacent ones of the plurality of first stator core parts. In the second state, the length of the non-magnetic gap between each of the plurality of first stator core parts and the second stator core part is longer than the length of the non-magnetic gap between adjacent ones of the plurality of first stator core parts.

In the first state, therefore, a portion of the magnetic flux generated by the current in the winding, which portion flows through the non-magnetic gap between the adjacent first stator core parts, mostly flows through the non-magnetic gap between the first stator core part and the second stator core part. That is, the magnetic flux generated by the current in the winding mostly flows through both the first stator core parts and the second stator core part. In the second state, the magnetic resistance of the magnetic circuit passing through the first stator core part is higher. A greater change of the magnetic resistance of the magnetic circuit for the winding, which passes through the stator core, is obtained. Accordingly, the inductance can be adjusted over a wider range.

Advantageous Effects of the Invention

A vehicle of the present invention is able to improve acceleration performance with stabilized rotation of an engine.

DETAILED DESCRIPTION OF THE INVENTION

Figure 1:
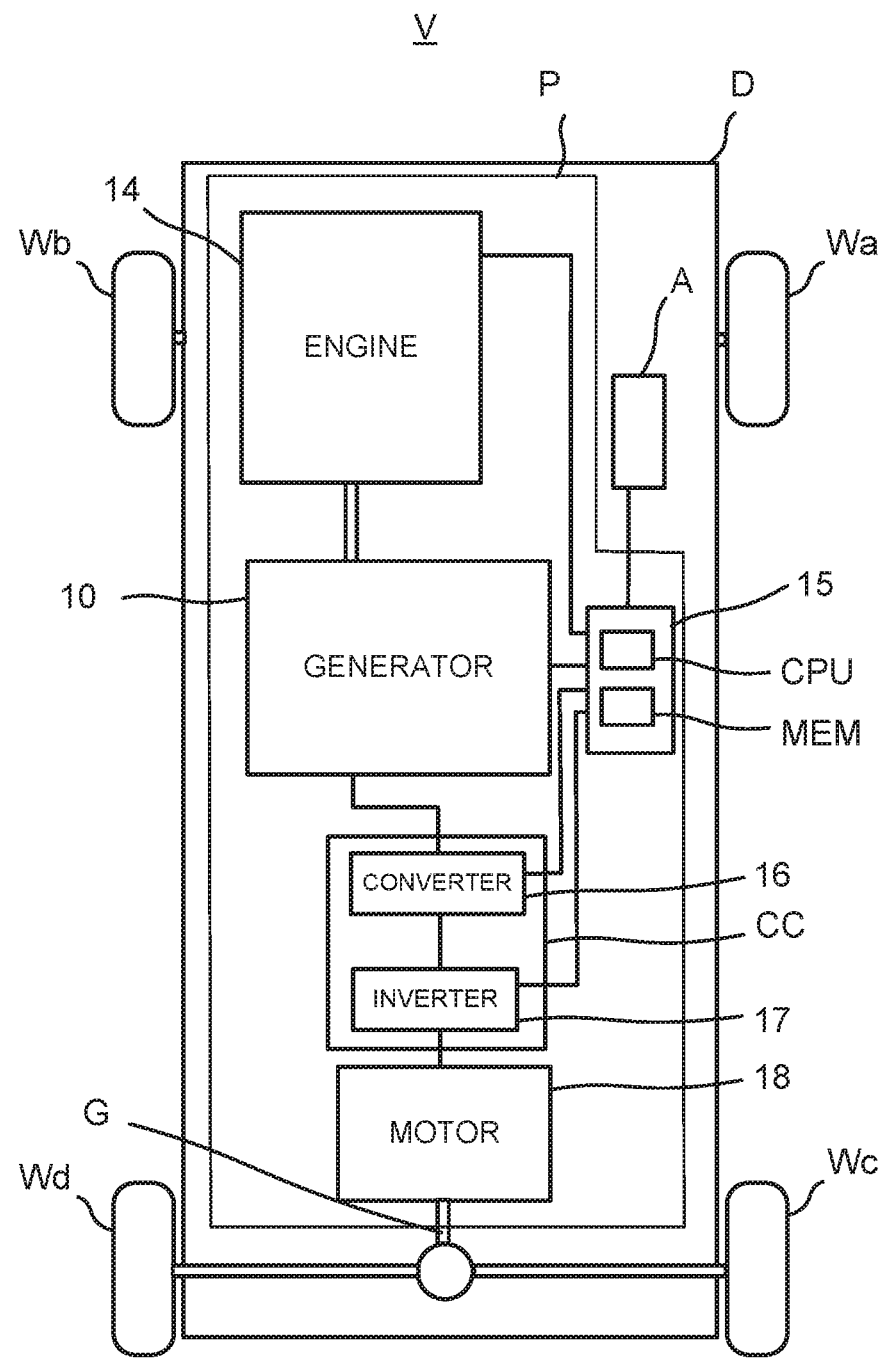
FIG. 1 is a block diagram showing an outline configuration of a vehicle according to a first embodiment of the present invention.

Studies conducted by the present inventor about a vehicle are described, the vehicle including a generator that is connected to an engine and a motor that receives a current supply from the generator.

As rotational power of the engine increases, the current supplied to the motor increases. As a result, the vehicle accelerates. The present inventor focused on a response of the current supplied to the motor in a case of increasing the rotational power of the engine. The present inventor particularly focused on a process in which the current supplied to the motor increases over time when the rotational power of the engine is increased.

The rotational power of the engine is converted into electric power by the generator. The electric power generated by the generator is supplied to the motor via a current adjustment device. The current adjustment device adjusts a current outputted from the generator. Thus, the current adjustment device adjusts the load torque of the generator. The current adjustment device has a function for, by adjusting a current outputted from the generator, dividing the rotational power of the engine into electric power of the generator and power for increasing the rotation speed of the engine.

For example, an attempt to indefinitely increase the current outputted from the generator by the current adjustment device in accordance with a request for increasing the current results in suppressing an increase of the rotation speed of the engine. It rather prolongs a required period for increasing the current to be supplied to the motor. On the other hand, an attempt to excessively limit the current outputted from the generator results in limiting the current to be supplied to the motor. That is, a required period for increasing the current to be supplied to the motor is prolonged.

To increase the current to be supplied to the motor, the current adjustment device under control of a control device adjusts the current outputted from the generator so as to increase the output current of the generator while increasing the rotation speed of the engine. As a result, a required period for increasing the current to be supplied to the motor is shortened. Therefore, acceleration performance improves.

In controlling the output current of the generator, for example, the control device obtains a target value of the output current based on the rotation speed of the engine and the output current of the generator. The control device controls the current adjustment device such that the output current attains the target value.

The current, which is controlled by the current adjustment device, flows in an electrical circuit including a winding of the generator. The current of the electrical circuit has transient characteristics which are attributable to the inductance of the winding.

If a response of the current during the control is delayed due to the inductance of the winding, an overshoot of the current is likely to occur. That is, a situation in which the current is beyond the target value is likely to occur. If the current increases beyond the target value during the control for increasing the current, the load torque of the generator excessively increases. When the increased load torque of the generator approaches the engine torque or exceeds the engine torque, the increase of the rotation speed of the engine is hindered.

In particular, a request for increasing the current is normally received when the rotation speed of the engine is relatively low. As the rotation speed of the engine is relatively low, the output torque of the engine is relatively low, too. Therefore, an excessive variation of the load torque of the generator has a great influence on the rotation speed of the engine. That is, the stability of engine rotation is impaired. In addition, a prolonged time is required to increase the rotation speed of the engine. As a result, a prolonged time is required to increase the current to be supplied to the motor. That is, the acceleration performance of the vehicle is impaired.

To handle a situation in which the current is beyond the target value due to a delayed response of the current, for example, it is conceivable to preliminarily limit the current outputted from the generator. Here, limiting the current outputted from the generator is limiting the current to be supplied to the motor. This impairs the acceleration performance of the vehicle.

The present inventor focused on the inductance of the winding.

It has been conventionally considered that reducing the inductance of a winding leads to reducing a linkage flux, which makes it difficult to ensure a sufficient current of the generator.

The present inventor focused on a magnetic circuit. A magnetic circuit that influences the inductance is a magnetic circuit for a winding. The magnetic circuit for a winding is different from a magnetic circuit that extends from a magnet of a rotor and passes through a winding. The studies conducted by the present inventor were based on clear distinction between the magnetic circuit for a winding and the magnetic circuit that extends from a magnet of a rotor and passes through a winding. The present inventor consequently discovered that a large change of the inductance can be implemented by changing the magnetic resistance of the magnetic circuit for a winding.

The present inventor found out that an excessive variation of the current can be suppressed by reducing the inductance of the winding.

In the present invention, upon reception of a request for increasing the current, the magnetic resistance of a magnetic circuit for a winding, which passes through a stator core, is increased. Accordingly, the inductance of the winding is reduced from the value obtained at a time point when the request for increasing is received. The reduced inductance of the winding allows a quick response of the current during the control. As a result, occurrence of a situation is suppressed in which the current varies beyond the target value. Thus, occurrence of a situation is suppressed in which the load torque of the generator approaches the engine torque or the load torque exceeds the engine torque during the control for increasing the output current of the generator. The engine rotation is stabilized. Moreover, a time required to increase the rotation speed of the engine is shortened.

In the following, the present invention is described based on preferred embodiments and with reference to the drawings.

FIG. 1 is a block diagram showing an outline configuration of a vehicle according to a first embodiment of the present invention.

A vehicle V shown in FIG. 1 is a four-wheel automobile. The vehicle V includes a drive system P and a vehicle body D. The vehicle body D of the vehicle V includes four wheels Wa, Wb, Wc, Wd, and a request indication device A. Therefore, the vehicle V includes the wheels Wa, Wb, Wc, Wd. The vehicle V includes the request indication device A.

The drive system P is a drive source of the vehicle V. The drive system P includes a generator 10, an engine 14, a control device 15, a converter 16, an inverter 17, and a motor 18. Therefore, the vehicle V includes the generator 10, the engine 14, the control device 15, the converter 16, the inverter 17, and the motor 18. The converter 16 and the inverter 17 are included in a current adjustment device CC which is described later.

The drive system P is connected to drive wheels Wc, Wd among the wheels Wa to Wd. The drive wheels Wc, Wd are connected to the drive system P via a transmission mechanism G. The drive system P drives the drive wheels Wc, Wd in rotation so that the vehicle V travels.

The drive wheels Wc, Wd represent one example of the driving member. The drive system P outputs mechanical power to the drive wheels Wc, Wd.

The request indication device A outputs a current request. The current request is a request for a current to be supplied to the motor 18. The request indication device A outputs a signal representing the current request.

The request indication device A has an accelerator operator. More specifically, the request indication device A is operated by a driver of the vehicle V. The request indication device A outputs a request for acceleration of the vehicle V based on an operation and the status of traveling of the vehicle V. The request for acceleration of the vehicle V corresponds to a torque for driving the drive wheels Wc, Wd. The request for acceleration of the vehicle V also serves as an output request requesting an output of the vehicle V. The output of the vehicle V corresponds to an output of the motor 18. The request for acceleration of the vehicle V corresponds to a request for an output torque of the motor 18. The output torque of the motor 18 corresponds to a current supplied to the motor 18. The request indication device A outputs, as a torque request for a torque to be outputted to the motor 18, the current request for the current to be supplied to the motor 18.

The request indication device A is connected to the control device 15. The request indication device A outputs a signal representing the current request to the control device 15. The current request includes a request for increasing the current and a request for reducing the current. The request for increasing the current corresponds to a request for increasing the output torque of the motor 18. The request for reducing the current corresponds to a request for reducing the output torque of the motor 18.

The control device 15 is constituted of a microcontroller, for example. The control device 15 includes a central processing unit CPU working as a computer, and a storage device MEM. The central processing unit CPU performs computational processing based on a control program. The storage device MEM stores data concerning programs and computation.

Figure 2:
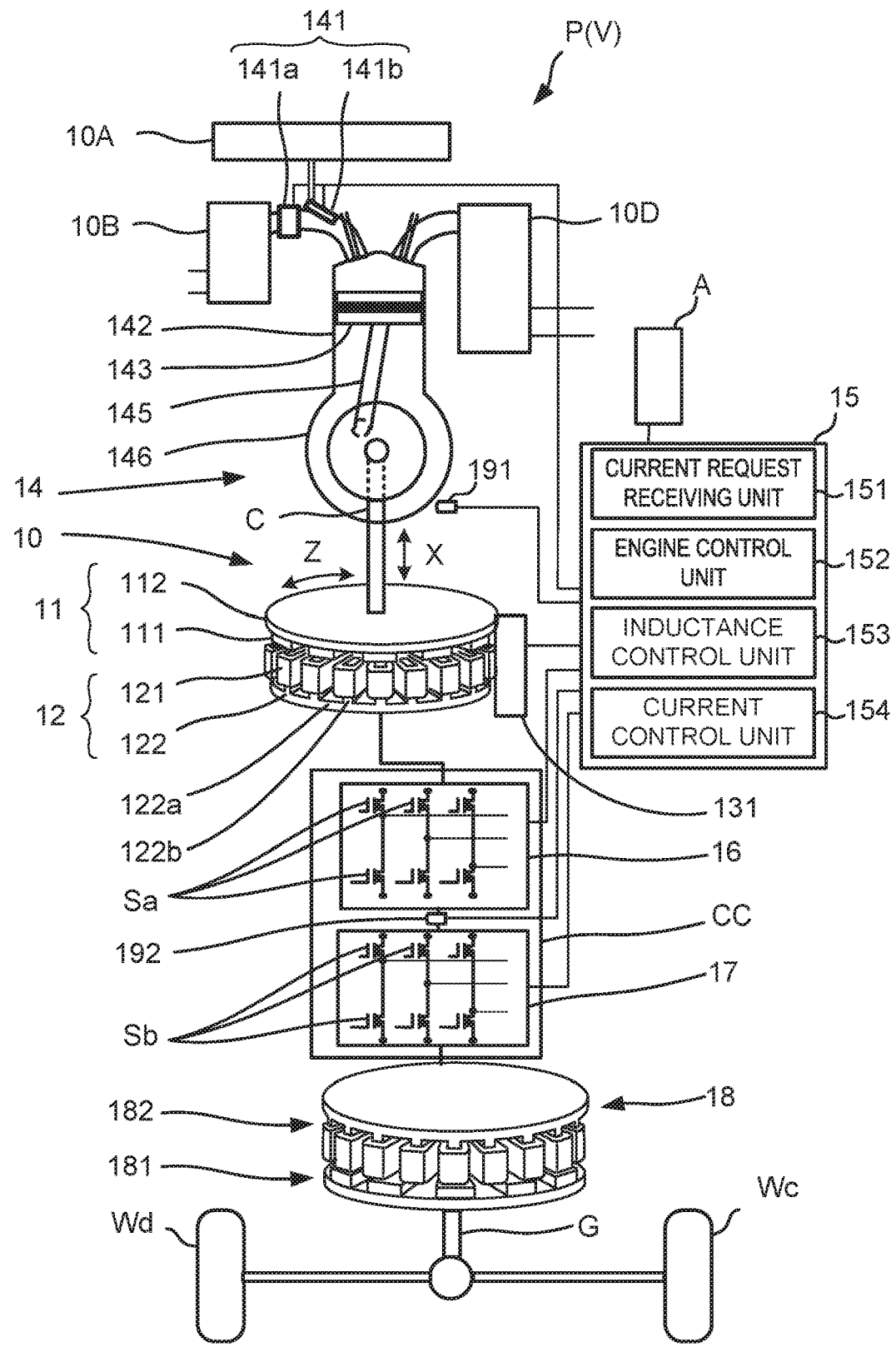
FIG. 2 is a system configuration diagram showing a more detailed configuration of the vehicle shown in FIG. 1.

FIG. 2 is a system configuration diagram showing a more detailed configuration of the vehicle shown in FIG. 1.

The vehicle V includes a fuel tank 10A, an air cleaner 10B, and a muffler 10D. The vehicle V also includes a rotation angle sensor 191 and a current sensor 192.

The engine 14 is an internal combustion engine. The engine 14 causes fuel combustion. Thus, the engine 14 outputs mechanical power. The engine 14 includes an output shaft C. The output shaft C is, for example, a crankshaft. FIG. 2 schematically shows the connection relationship between the engine 14 and the output shaft C. The engine 14 includes a cylinder 142, a piston 143, a connecting rod 145, and a crank case 146. The cylinder 142 and the piston 143 define a combustion chamber. The piston 143 and the crankshaft serving as the output shaft C are connected via the connecting rod 145.

The engine 14 is supplied with air via the air cleaner 10B. The engine 14 is supplied with a fuel from the fuel tank 10A. The engine 14 causes the fuel supplied from the fuel tank 10A to combust in the combustion chamber, so that the piston 143 moves to-and-fro. The crankshaft serving as the output shaft C converts the to-and-fro movement into rotational power. The engine 14 outputs mechanical power through the output shaft C. An exhaust gas generated by the combustion in the engine 14 is discharged via the muffler 10D. The rotation speed of the output shaft C represents the rotation speed of the engine 14.

As for power transmission from the engine 14 to the drive wheels Wc, Wd, the engine 14 is not connected to the drive wheels Wc, Wd by any mechanical component. The drive wheels Wc, Wd are driven by the motor 18, without receiving rotational power from the engine 14. The drive wheels Wc, Wd are driven by the motor 18, to drive the vehicle V. All of the rotational power outputted from the engine 14 is once converted into power other than mechanical power in the drive system P. The rotational power generated by the engine 14 is converted exclusively into electric power. More specifically, all of the mechanical power generated by the engine 14 except a loss is converted into electric power by the generator 10. The electric power resulting from the conversion in the generator 10 is converted into mechanical power by the motor 18.

The drive system P does not directly drive an external mechanism arranged outside the drive system P by using the rotational power of the engine 14. To be specific, the engine 14 does not directly drive the drive wheels Wc, Wd by the rotational power. Therefore, the control of the rotational power of the engine 14 is less influenced by constraints inherent in operation characteristics of the external mechanism. This provides a high degree of freedom in terms of controlling the rotational power of the engine 14.

The engine 14 includes an engine output adjustment device 141. The engine output adjustment device 141 adjusts the rotational power of the engine 14. The engine output adjustment device 141 includes a throttle valve adjustment mechanism 141a and a fuel injection device 141b. The throttle valve adjustment mechanism 141a adjusts the amount of air taken in by the engine 14. The fuel injection device 141b supplies a fuel to the engine 14. The engine output adjustment device 141 controls the amount of air taken in and the amount of fuel injected by the engine 14. In this manner, the engine output adjustment device 141 adjusts the rotational power to be outputted from the engine 14. For example, the engine output adjustment device 141 increases the amount of air taken in and the amount of fuel injected by the engine 14. This causes an increase of the rotational power of the engine 14. As the rotational power of the engine 14 increases, the rotation speed of the engine 14 which means the rotation speed of the output shaft C increases.

The rotation angle sensor 191 detects the rotation angle of the output shaft C. That is, the rotation angle sensor 191 detects the rotation angle of a rotor 11 of the generator 10. The rotation speed of the output shaft C is detected based on the detection of the rotation angle of the output shaft C.

As for power transmission from the engine 14 to the generator 10, the generator 10 is mechanically connected to the engine 14. The generator 10 is connected to the output shaft C of the engine 14. In this embodiment, the generator 10 is directly connected to the output shaft C. The generator 10 receives rotational power from the engine 14, and supplies a current to the motor 18. The generator 10 is, for example, attached to the crank case 146 of the engine 14. Alternatively, for example, the generator 10 may be arranged in a position distant from the crank case 146.

The generator 10 includes the rotor 11, a stator 12, and an inductance adjustment device 131.

The generator 10 is a three-phase brushless generator. The rotor 11 and the stator 12 constitute a three-phase brushless generator.

The rotor 11 includes permanent magnets. To be more specific, the rotor 11 includes a plurality of magnetic pole parts 111 and a back yoke part 112. The magnetic pole part 111 is made of a permanent magnet. The back yoke part 112 is made of, for example, a ferromagnetic material. The magnetic pole parts 111 are arranged between the back yoke part 112 and the stator 12. The magnetic pole parts 111 are attached to the back yoke part 112. The plurality of magnetic pole parts 111 are arranged so as to align in a circumferential direction Z about the rotation axis of the rotor 11, that is, so as to align in the direction of rotation of the rotor 11. The plurality of magnetic pole parts 111 are arranged such that N-poles and S-poles alternate with respect to the circumferential direction Z. The generator 10 is a three-phase brushless generator of permanent magnet type. A winding for supplying a current is not provided on the rotor 11.

The rotor 11 is connected to the output shaft C of the engine 14. The rotor 11 is rotated by rotational power transmitted from the engine 14.

The rotation angle sensor 191 detects the rotation angle of the output shaft C. That is, the rotation angle sensor 191 detects the rotation angle of the rotor 11 of the generator 10.

The stator 12 is arranged opposite to the rotor 11. The stator 12 includes a plurality of windings 121 and a stator core 122. The stator core 122 is made of, for example, a ferromagnetic material. The stator core 122 forms a magnetic circuit of the stator 12. The plurality of windings 121 are wound on the stator core 122. The stator core 122 includes a core main body 122a (see FIGS. 4A and 4B) and a plurality of teeth 122b. The core main body 122a functions as a yoke. The plurality of teeth 122b extend from the core main body 122a toward the rotor 11. The teeth 122b extending toward the rotor 11 have their distal end surfaces opposed to the magnetic pole parts 111 of the rotor 11 with an air gap therebetween. The teeth 122b of the stator core 122 and the magnetic pole parts 111 of the rotor 11 are directly opposite to each other. The plurality of teeth 122b, which are arranged at intervals with respect to the circumferential direction Z, align in the circumferential direction Z. Each of the plurality of windings 121 is wound on each of the plurality of teeth 122b. Each winding 121 is wound so as to pass through a slot between the plurality of teeth 122b. Each winding 121 corresponds to any of the three phases, namely, U-phase, V-phase, and W-phase. The windings 121 corresponding to U-phase, V-phase, and W-phase are arranged in order in the circumferential direction Z.

The rotor 11 is connected to the output shaft C of the engine 14. The rotor 11 is rotated along with rotation of the output shaft C. The rotor 11 has the magnetic pole parts 111 rotating in a state where the magnetic pole parts 111 are opposite to the teeth 122b of the stator core 122. As the rotor 11 rotates, magnetic fluxes linked with the windings 121 change. As a result, an induced voltage is generated in the windings 121. This is how the generator 10 performs power generation. The generator 10 supplies a generated current to the motor 18. The current outputted from the generator 10 is supplied to the motor 18. In more detail, the current outputted from the generator 10 is supplied to the motor 18 via the current adjustment device CC. As the current outputted from the generator 10 increases, a current supplied from the converter 16 to the inverter 17 increases, so that a current supplied to the motor 18 increases. A voltage outputted from the generator 10 is supplied to the motor 18 via the converter 16 and the inverter 17.

In this embodiment, the rotor 11 and the stator 12 have an axial gap structure. The rotor 11 and the stator 12 are opposite to each other with respect to the direction (axial direction) X of the rotation axis of the rotor 11. The plurality of teeth 122b included in the stator 12 protrude in the axial direction X from the core main body 122a. In this embodiment, the axial direction X is a direction in which the rotor 11 and the stator 12 are opposite to each other. A magnetic circuit for the winding 121 is, for example, a close-loop circuit. The magnetic circuit for the winding 121 is a circuit that passes through an internal path of the winding 121, then goes out from one end portion (the end portion close to the rotor) of the internal path of the winding 121, then enters one end portion (the end portion close to the rotor) of an internal path of an adjacent winding 121, then passes through the internal path of the adjacent winding 121, then goes out from the other end portion (the end portion remote from the rotor) of the internal path of the adjacent winding 121, and then enters the other end portion (the end portion remote from the rotor) of the internal path of the winding 121. The internal path of the winding 121 is a path provided within the winding 121 so as to extend in the direction in which the rotor 11 and the stator 12 are opposite to each other. The magnetic circuit for the winding 121 partially has a non-magnetic gap such as an air gap. The magnetic circuit for the winding is, for example, made up of the stator core 122 and a non-magnetic gap.

The inductance adjustment device 131 changes an inductance L of the winding 121. The inductance adjustment device 131 changes the magnetic resistance of the magnetic circuit for the winding 121, which passes through the stator core 122. Thus, the inductance adjustment device 131 changes the inductance of the winding 121. The inductance adjustment device 131 is an inductance adjustment mechanism. The inductance adjustment device 131 is also able to adjust the current to be supplied from the generator 10 to the motor 18.

Details of the adjustment of the inductance made by the inductance adjustment device 131 are described later.

The current adjustment device CC is arranged between the generator 10 and the motor 18. The current adjustment device CC is arranged in an electric power supply path between the generator 10 and the motor 18. The current adjustment device CC is connected to the generator 10. The current adjustment device CC is connected to the motor 18.

The current adjustment device CC adjusts the current outputted from the generator 10 to the motor 18.

The current adjustment device CC includes the converter 16 and the inverter 17. The converter 16 is connected to the generator 10. The inverter 17 is connected to the converter 16 and the motor 18. Electric power outputted from the generator 10 is supplied through the current adjustment device CC to the motor 18. In other words, electric power outputted from the generator 10 is supplied through the converter 16 and the inverter 17 to the motor 18.

The current sensor 192 detects the current to be supplied from the generator 10 to the motor 18.

The converter 16 rectifies the current outputted from the generator 10. The converter 16 converts a three-phase AC outputted from the generator 10 into a DC. The converter 16 outputs the DC. The converter 16 has an inverter circuit, for example. The converter 16 has a three-phase bridge inverter circuit, for example. The three-phase bridge inverter circuit includes switching elements Sa corresponding to the respective three phases.

The operation of the converter 16 is controlled by the control device 15. For example, the converter 16 changes the timing for turning on/off the switching elements Sa relative to a predetermined phase angle in the three-phase AC. In this manner, the converter 16 can adjust the current to be supplied to the motor 18. This is how the converter 16 adjusts the electric power to be supplied to the motor 18. The control of the converter 16 made by the control device 15 is described later.

The inverter 17 supplies a current for driving the motor 18 to the motor 18. The inverter 17 is supplied with the DC from the converter 16. The inverter 17 converts the DC outputted from the converter 16 into a three-phase current with phases shifted by 120 degrees. The phases of the three-phase current correspond to the three phases of the three-phase brushless motor, respectively. The inverter 17 has a three-phase bridge inverter circuit, for example. The three-phase bridge inverter circuit includes switching elements Sb each corresponding to each of the three phases. The switching elements Sb are controlled based on a signal supplied from a position sensor (not shown) that detects the rotation position of the rotor 181.

The inverter 17 adjusts on/off operations of the switching elements Sb, to control the voltage to be supplied to the motor 18. For example, the inverter 17 turns on the switching elements Sb based on a pulse-width-modulated signal. The control device 15 adjusts the duty cycle of ON/OFF. Thus, the voltage to be supplied to the motor 18 is controlled to an arbitrary value by the control device 15. This is how the inverter 17 adjusts the electric power to be supplied to the motor 18.

The motor 18 in this embodiment is a three-phase brushless motor. The current adjustment device CC includes the inverter 17. For example, a DC motor is adoptable as the motor 18. In a case where a DC motor is adopted as the motor 18, the inverter 17 is not provided. In this case, the current adjustment device CC includes the converter 16 alone.

The motor 18 is operated by the electric power that is supplied from the generator 10. The motor 18 drives the drive wheels Wc, Wd in rotation. Thus, the motor 18 makes the vehicle V travel. As for power transmission, the motor 18 is not mechanically connected to the generator 10. The motor 18 receives a current supply from the generator 10 without interposition of a battery.

The motor 18 is, for example, a three-phase brushless motor. The motor 18 includes a rotor 181 and a stator 182. The rotor 181 and the stator 182 of the motor 18 of this embodiment have the same structure as that of the rotor 11 and the stator 12 of the generator 10.

The rotor 181 of the motor 18 is connected to the drive wheels Wc, Wd via the transmission mechanism G.

In this embodiment, the generator 10 is electrically connected to the motor 18. It is therefore not necessary to arrange a mechanical power transmission between the generator 10 and the motor 18. This provides a high degree of freedom in terms of arrangement of the generator 10 and the motor 18. For example, it is possible that the generator 10 is provided in the engine 14 while the motor 18 is arranged near the drive wheels Wc, Wd serving as the driving member.

The rotor and the stator of the motor 18 may be configured differently from those of the generator 10. For example, the number of magnetic poles or the number of teeth of the motor 18 may be different from those of the generator 10. For example, an induction motor or a stepper motor may be adopted as the motor 18. For example, a DC motor with brushes may be adopted as the motor 18.

The motor 18 is mechanically connected to the drive wheels Wc, Wd such that rotational power is transmitted to the drive wheels Wc, Wd. The motor 18 is mechanically connected to the drive wheels Wc, Wd via the transmission mechanism G. More specifically, the rotor 181 of the motor 18 is connected to the transmission mechanism G.

The control device 15 controls the engine output adjustment device 141, the inductance adjustment device 131, and the current adjustment device CC. The control device 15 controls the engine output adjustment device 141, the inductance adjustment device 131, and the current adjustment device CC, in accordance with a current request. The current request is outputted from the request indication device A in accordance with the amount of operation of the request indication device A.

The control device 15 controls the current to be supplied to the motor 18, by controlling the engine output adjustment device 141, the inductance adjustment device 131, and the current adjustment device CC. Since the current supplied to the motor 18 is controlled, the output torque of the motor 18 is controlled. That is, the control device 15 controls the output torque of the motor 18. Since the output torque of the motor 18 is controlled, the output torque of the drive wheels Wc, Wd serving as the driving member is controlled. That is, the control device 15 controls the output torque of the drive wheels Wc, Wd.

The control device 15 is connected to the engine output adjustment device 141 of the engine 14 and the inductance adjustment device 131 of the generator 10. The control device 15 is also connected to the current adjustment device CC. The control device 15 is connected to the converter 16 and the inverter 17. The control device 15 is connected to the rotation angle sensor 191 and the current sensor 192. The control device 15 obtains information about the rotation speed of the engine 14, which means information about the rotation speed of the output shaft C of the engine 14, based on a signal supplied from the rotation angle sensor 191. The control device 15 obtains information about the rotation position of the rotor 181 based on a signal supplied from the rotation angle sensor 191. The control device 15 obtains information about the current supplied from the generator 10 to the motor 18 based on a signal supplied from the current sensor 192.

The control device 15 includes a current request receiving device 151, an engine control device 152, an inductance control device 153, and a current control device 154.

The current request receiving device 151, the engine control device 152, the inductance control device 153, and the current control device 154 are implemented by the central processing unit CPU of the control device 15 executing programs. An operation of each of the current request receiving device 151, the engine control device 152, the inductance control device 153, and the current control device 154, which is described later, can be considered as an operation of the control device 15.

The engine control device 152 controls the engine output adjustment device 141. The engine control device 152 directs the engine output adjustment device 141 to adjust the rotational power of the engine 14.

The current control device 154 controls the current adjustment device CC. The current control device 154 directs the current adjustment device CC to adjust the current outputted from the generator 10 to the motor 18. In this embodiment, the current control device 154 controls both the converter 16 and the inverter 17.

The current control device 154 performs a phase control on the converter 16. The phase control is a control for advancing or retarding a conduction timing of the switching elements Sa of the converter 16. In the phase control, each of the plurality of switching elements Sa is turned on/off with a cycle equal to the cycle of the induced voltage of the winding 121.

Figure 3:
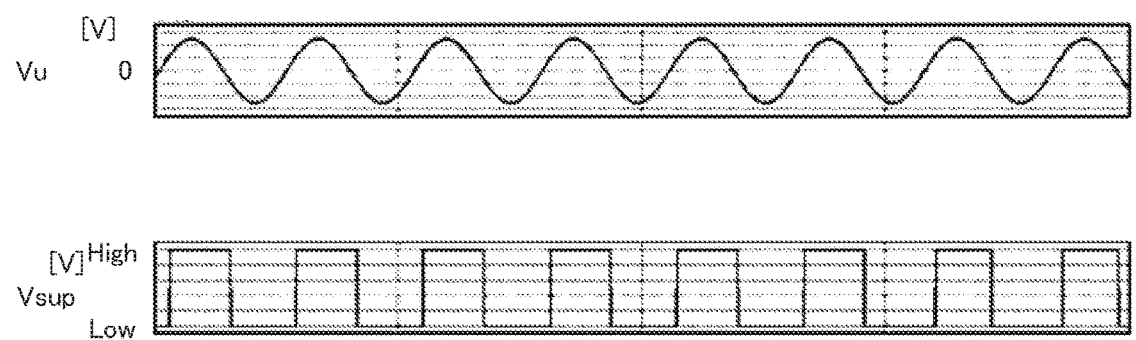
FIG. 3 is a diagram showing an exemplary waveform of a voltage in a phase control.

FIG. 3 is a diagram showing an exemplary waveform of a voltage in the phase control.

In FIG. 3, Vu represents the induced voltage of the stator winding corresponding to U-phase among the stator windings 121 of the generator 10 corresponding to the plurality of phases.

Vsup represents a control signal of the switching element Sa connected to the stator winding corresponding to U-phase among the plurality of switching elements Sa included in the converter 16. More specifically, Vsup represents a control signal of two switching elements Sa connected to the stator winding corresponding to U-phase. H level of Vsup represents ON state of the switching element Sa. L level represents OFF state. The induced voltages and the control signals of U-phase, V-phase, and W-phase are shifted by 120 degrees relative to one another.

In the phase control, the current control device 154 controls on/off of the switching element Sa connected to the stator winding corresponding to U-phase, in accordance with the signal Vsup whose cycle is equal to the cycle of the induced voltage of the winding 121. The duty cycle of ON/OFF of the plurality of switching elements Sa is fixed. The current control device 154 generates the signal Vsup whose cycle is equal to the cycle of the induced voltage of the winding 121 based on an output signal of the rotation angle sensor 191, for example.

The current control device 154 controls the current flowing from the stator winding to the motor 18 by advancing or retarding the conduction timing of the switching element Sa in the phase control. For example, the current control device 154 reduces the current outputted from the generator 10 by advancing the on/off phase of the corresponding switching element Sa relative to the induced voltage Vu. The current control device 154 increases the current outputted from the generator 10 by retarding the on/off phase of the corresponding switching element Sa relative to the induced voltage Vu.

In this manner, the current control device 154 controls the phase of on/off operation of each of the plurality of switching elements Sa relative to the phase of the induced voltage of the winding 121. As the phase of on/off operation is advanced or retarded, the current to be outputted from the converter 16 is increased or reduced. Thus, adjustment of the current to be outputted from the converter 16 is implemented by the current control device 154 controlling the converter 16. In other words, adjustment of the current outputted from the generator 10 to the motor 18 is implemented by the current control device 154 controlling the converter 16.

It may be possible that the current control device 154 performs a control different from the phase control described above. For example, the current control device 154 may perform a vector control instead of the phase control. The vector control is a control method in which the current of the generator 10 is divided into a d-axis component and a q-axis component, the d-axis component corresponding to the magnetic flux direction of the magnetic pole, the q-axis component being at right angles to the magnetic flux direction in the electrical angle. In the vector control, the switching element Sa is operated based on a pulse-width-modulated (PWM) signal with a cycle shorter than the cycle of the induced voltage of the winding 121. In the vector control, the plurality of windings 121 are rendered conducting such that a sinusoidal current flows in each phase thereof. As the duty cycle of the signal is controlled, the current to be outputted from the converter 16 is increased or reduced.

The current control device 154 directs the inverter 17 to adjust the current to be outputted to the motor 18. The current control device 154 performs on/off operation of the plurality of switching elements Sa at timings corresponding to 120-degree conduction. The current control device 154 performs a pulse-width-modulated (PWM) control on the plurality of switching elements Sa. For example, the current control device 154 turns on the switching element Sa based on a pulse-width-modulated signal. The current control device 154 controls the duty cycle of the turn-on signal, thus adjusting the current to be outputted to the motor 18. The current control device 154 controls the duty cycle, thus adjusting the current inputted from the converter 16 to the inverter 17. That is, adjustment of the current outputted from the generator 10 to the motor 18 is implemented by the current control device 154 controlling the converter 16. The current control device 154 may perform the pulse width modulation by using a pulse having a higher frequency than the upper limit of an audible frequency. The audible frequency is a frequency from 20 Hz to 20 kHz.

It may be possible that the current control device 154 performs a control different from the 120-degree conduction control. The current control device 154 may perform a vector control, for example.

As described above, the current control device 154 controls the current adjustment device CC, to control the current outputted from the generator 10 to the motor 18. The load torque of the generator 10 depends on the current outputted from the generator 10. Therefore, the current control device 154 controls the current adjustment device CC, to control the load torque of the generator 10.

The inductance control device 153 controls the inductance adjustment device 131. The inductance control device 153 directs the inductance adjustment device 131 to adjust the inductance of the winding 121. The inductance control device 153 directs the inductance adjustment device 131 to change the magnetic resistance of the magnetic circuit for the winding 121, which passes through the stator core 122. The inductance control device 153 changes the inductance of the winding 121 in this manner.

Either the converter 16 or the inverter 17 can be used to control the current outputted from the generator 10. It is therefore acceptable that the current control device 154 controls one of the converter 16 and the inverter 17 in order to control the current outputted from the generator 10. For example, the current control device 154 performs the phase control on the converter 16 while performing the 120-degree conduction control on the inverter 17. In this case, the current control device 154 makes the adjustment by advancing or retarding the phase of the converter 16, without performing the PWM control on the inverter 17. Only the converter 16 is used to control the current outputted from the generator 10.

Instead, the current control device 154 may perform the PWM control on the inverter 17, without making the adjustment by advancing or retarding the phase of the converter 16. Only the inverter 17 is used to control the current outputted from the generator 10.

Inductance Adjustment Device

Figure 4A:
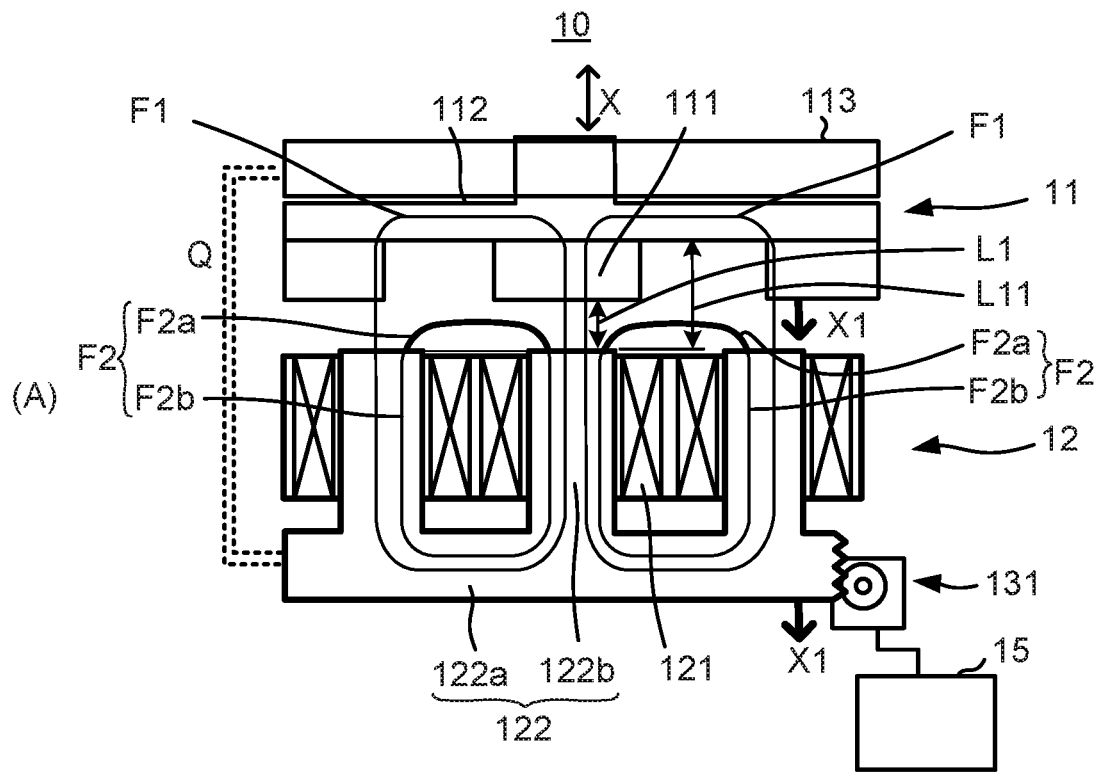
FIG. 4A is a schematic diagram showing a high-inductance state, for explanation of adjustment made by an inductance adjustment device included in a generator shown in FIG. 2.
Figure 4B:
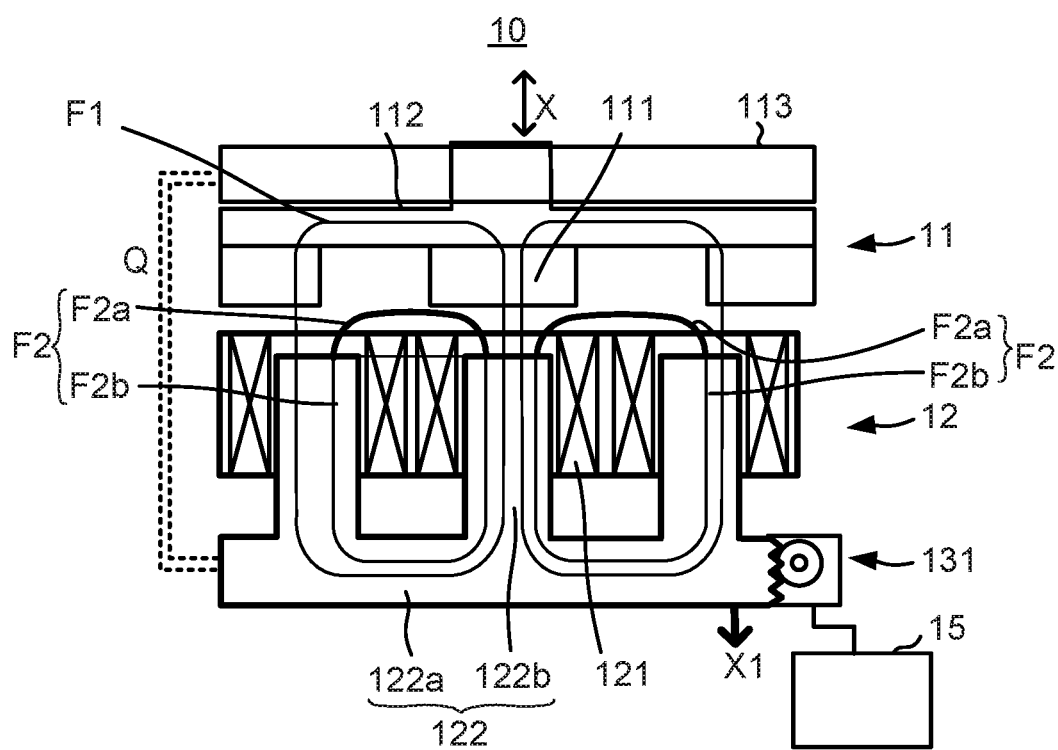
FIG. 4B is a schematic diagram showing a low-inductance state.

FIG. 4A and FIG. 4B are schematic diagrams for explanation of adjustment made by the inductance adjustment device 131 provided in the generator 10 shown in FIG. 2. FIG. 4A shows a high-inductance state of the generator 10. FIG. 4B shows a low-inductance state of the generator 10.

FIG. 4A illustrates a part of the rotor 11 and a part of the stator 12 provided in the generator 10. The generator 10 of this embodiment includes an SPM (Surface Permanent Magnet) generator. The rotor 11 and the stator 12 are opposite to each other. More specifically, the magnetic pole parts 111 of the rotor 11 and the teeth 122b of the stator core 122 of the stator 12 are opposite to each other with the air gap therebetween. The magnetic pole parts 111 are exposed to the stator 12.

The inductance adjustment device 131 changes the magnetic resistance of a magnetic circuit F2 for the winding 121, which passes through the stator core 122. In this manner, the inductance adjustment device 131 changes the inductance of the winding 121, to adjust the current to be supplied to the motor 18. In more detail, the inductance adjustment device 131 moves the position of the stator core 122 relative to the winding 121. This is how the inductance adjustment device 131 changes the magnetic resistance of the magnetic circuit F2 for the winding 121, which passes through the stator core 122.

The windings 121 are secured to a casing (not shown) of the generator 10. The stator core 122 is supported on the casing such that the stator core 122 is freely movable in the axial direction X relative to the windings 121. The windings 121 are not secured to the teeth 122b. A gap is ensured between each winding 121 having a cylindrical shape and each tooth 122b. The gap is to such an extent that the tooth 122b is freely movable relative to the winding 121.

The inductance adjustment device 131 moves the stator core 122 such that the teeth 122b are moved into and out of the cylindrically wound windings 121. In this embodiment, the inductance adjustment device 131 moves the stator core 122 in the axial direction X. The control device 15 operates the inductance adjustment device 131 in accordance with the current request.

In FIG. 4A, for the purpose of describing the movement of the stator core 122 in an easy-to-understand manner, the inductance adjustment device 131 is schematically illustrated in the form of a rack-and-pinion mechanism and a motor. Here, mechanisms other than the illustrated one are adoptable as the inductance adjustment device 131 that moves the stator core 122. For example, a mechanism including a cylindrical member that is arranged concentric with a stator core in threaded engagement with the stator core is adoptable. Such a mechanism is able to move the stator core in the axial direction X by, for example, rotating the cylindrical member relative to the stator core.

The inductance adjustment device 131 moves the position of the stator core 122 relative to the winding 121 while maintaining the position of the stator core 122 relative to the rotor 11. In FIG. 4A, the broken lines Q express that the rotor 11 moves in conjunction with the stator core 122 in the axial direction X. A structure for maintaining the relative position between the rotor 11 and the stator core 122 is implemented by, for example, a bearing part 113 rotatably supporting the rotor 11. The position of the bearing part 113 is fixed relative to the stator core 122.

FIG. 4A and FIG. 4B illustrate primary magnetic fluxes generated by the magnetic pole parts 111. The line of each magnetic flux represents a primary magnetic circuit through which the magnetic flux generated by the magnetic pole part 111 flows. The magnetic circuit through which the magnetic flux flows is referred to as a magnetic circuit F1.

The primary magnetic flux generated by the magnetic pole part 111 flows through the magnetic pole part 111, the air gap between the magnetic pole part 111 and the tooth 122b, the tooth 122b, the core main body 122a, and the back yoke part 112. In other words, the magnetic circuit F1 is made up of the magnetic pole part 111, the air gap between the magnetic pole part 111 and the tooth 122b, the tooth 122b, the core main body 122a, and the back yoke part 112.

Here, FIG. 4A and FIG. 4B show three teeth 122b among the plurality of teeth 122b arranged in the circumferential direction. For providing plain illustration of the magnetic circuits F1, FIG. 4A and FIG. 4B show a state in which the magnetic pole part 111 is opposite to the middle tooth 122b among the three teeth 122b.

As the rotor 11 rotates, the amount of magnetic flux generated by the magnetic pole part 111 and linked with the winding 121 changes. The change of the amount of magnetic flux linked with the winding 121 causes an induced voltage to occur in the winding 121. That is, power is generated.

The induced voltage caused in the winding 121 depends on the amount of magnetic flux linked with the winding 121. The higher the magnetic resistance of the magnetic circuit F1 is, the smaller the amount of magnetic flux linked with the winding 121 is. The magnetic resistance of the magnetic circuit F1 depends mainly on the magnetic resistance of the air gap between the tooth 122b and the magnetic pole part 111. The magnetic resistance of the air gap between the tooth 122b and the magnetic pole part 111 depends on an air gap length L1 of the air gap between the tooth 122b and the magnetic pole part 111. Hereinafter, a length of a gap refers to a width of the gap.

Accordingly, the induced voltage caused in the winding 121 depends on the air gap length L1 of the air gap between the tooth 122b and the magnetic pole part 111.

FIG. 4A and FIG. 4B illustrate a primary magnetic flux generated by a current flowing in the winding 121. At a time of power generation, a current caused by the induced voltage flows in the winding 121. The magnetic flux is generated by the current flowing in the winding 121 at the time of power generation. The line of each magnetic flux represents a primary magnetic circuit through which the magnetic flux generated by the current in the winding 121 flows. The magnetic circuit through which the magnetic flux flows is referred to as a magnetic circuit F2. The magnetic circuit F2 is the magnetic circuit for the winding 121. The magnetic circuit F2 for the winding 121 is made up of a path passing through the inside of the winding 121 and providing the minimum magnetic resistance of the entire magnetic circuit F2.

The magnetic circuit F2 passes through the stator core 122. The magnetic circuit F2 passes through adjacent teeth 122b. In the drawing, three teeth 122b among the plurality of teeth 122b arranged in the circumferential direction are shown. The magnetic circuit F2 for the winding 121 wound on the middle tooth 122b among the three teeth 122b is illustrated as a typical example. A magnetic circuit F2 for a certain winding 121 passes through a tooth 122b having the certain winding 121 wound thereon and two teeth 122b adjacent to the certain tooth 122b.

The primary magnetic flux generated by the current in the winding 121 flows through the teeth 122b, the core main body 122a, and the air gap between the two adjacent teeth 122b. In other words, the magnetic circuit F2 is made up of the teeth 122b, the core main body 122a, and the air gap between the two adjacent teeth 122b. The magnetic circuit F2 passing through the stator core 122 includes one air gap. A portion of the magnetic circuit F2 including the air gap is indicated by the bold line. The bold-line portion of the magnetic circuit F2 including the air gap is simply referred to as an air gap F2a. The air gap F2a exists between the winding 121 and the rotor 11. The air gap F2a included in the magnetic circuit F2 exists between the winding 121 and the rotor 11 and between the adjacent teeth 122b. The air gap F2a is a non-magnetic gap. A portion of the magnetic circuit F2 corresponding to the air gap F2a is provided so as to connect respective portions of the two adjacent teeth 122b opposite to the rotor 11.

The magnetic circuit F2 for the winding 121 includes the air gap F2a between the two adjacent teeth 122b. The magnetic circuit F2 does substantially not include the back yoke part 112 of the rotor 11. Most of the magnetic flux generated by the current in the winding 121 flows through the air gap between the two adjacent teeth 122b without going to the back yoke part 112 of the rotor 11, for the following reasons.

For the magnetic flux generated by the current in the winding 121, the magnetic pole part 111 is considered simply as a magnetic flux path. In this embodiment, the magnetic pole part 111 is made of a permanent magnet whose magnetic permeability is as low as air. The magnetic pole part 111 can therefore be considered as equivalent to air for the magnetic circuit F2. Since the magnetic pole part 111 is equivalent to air, the substantial air gap length of the air gap between the stator 12 and the rotor 11 is equal to a distance L11 from the tooth 122b to the back yoke part 112. The distance L11 from the tooth 122b to the back yoke part 112 includes the thickness of the magnetic pole part 111 with respect to the axial direction X. Thus, the distance L11 is longer than the distance L1 from the tooth 122b to the magnetic pole part 111.

In this embodiment, moreover, the amount of the magnetic flux generated by the current in the winding 121 is smaller than the amount of magnetic flux generated by the permanent magnet of the magnetic pole part 111. Most of the magnetic flux generated by the current in the winding 121 is less likely to reach the back yoke part 112 across the air gap length L11. Little of the magnetic flux generated by the current in the winding 121 flows through the back yoke part 112.

Thus, most of the magnetic flux generated by the current in the winding 121 flows through the air gap F2a between the teeth 122b rather than through the back yoke part 112 of the rotor 11. In the state shown in FIG. 4A, the inductance of the winding 121 is set to the highest settable value. In the state shown in FIG. 4A, the air gap F2a included in the magnetic circuit F2 has the highest magnetic resistance among portions of the magnetic circuit F2. The air gap F2a has a higher magnetic resistance than that of a remaining portion F2b of the magnetic circuit F2 other than the air gap F2a.

The inductance of the winding 121 depends on the magnetic resistance of the magnetic circuit F2 for the winding 121. The inductance of the winding 121 is in reverse proportion to the magnetic resistance of the magnetic circuit F2 for the winding 121.

Here, the magnetic resistance of the magnetic circuit F2 for the winding 121 is the magnetic resistance of the magnetic circuit F2 through which the magnetic flux generated by the current in the winding 121 flows. The magnetic resistance of the magnetic circuit F2 for the winding 121, which passes through the stator core 122, includes the magnetic resistance of the air gap between the two adjacent teeth 122b. In a strict sense, the magnetic flux generated by the current in the winding 121 flows through both the stator 12 and the rotor 11. As described above, however, most of the magnetic flux generated by the current in the winding 121 flows through the air gap between the two adjacent teeth 122b without going to the back yoke part 112 of the rotor 11. Therefore, the magnetic resistance to the winding 121 depends more strongly on the magnetic resistance of the magnetic circuit F2 passing through the stator 12 than on the magnetic resistance of the magnetic circuit F1 passing through the rotor 11. That is, the inductance of the winding 121 depends more strongly on the magnetic resistance of the magnetic circuit F2, which passes through the stator core 122 when viewed from the winding 121 side, than on the magnetic resistance of the magnetic circuit F1, which passes through the rotor 11 when viewed from the winding 121 side. Accordingly, the inductance of the winding 121 substantially depends on the magnetic resistance of the magnetic circuit F2, which passes through the stator core 122 when viewed from the winding 121 side.

The inductance adjustment device 131 moves the position of the stator core 122 relative to the winding 121. In this manner, the inductance adjustment device 131 changes the magnetic resistance of the magnetic circuit F2 for the winding 121, which passes through the stator core 122. This is how the inductance adjustment device 131 changes the inductance of the winding 121. For example, in a case of the inductance adjustment device 131 moving the stator core 122 in a direction indicated by the arrow X1, the teeth 122b of the stator core 122 are moved out of the cylindrically wound windings 121.

FIG. 4B shows a state having a lower inductance than that of the state shown in FIG. 4A.

Since the teeth 122b of the stator core 122 are moved out of the windings 121, the volume of the stator core 122 existing within the windings 121 is reduced. As a result, the magnetic flux within the winding 121 spreads. From the viewpoint of the magnetic circuit F2 for the winding 121, the length of the air gap F2a constituting the magnetic circuit F2 increases. This increases the magnetic resistance of the air gap F2a existing between the winding 121 and the rotor 11. That is, the magnetic resistance of the air gap F2a, whose magnetic resistance is highest, increases. As a result, the magnetic resistance of the magnetic circuit F2 for the winding 121, which passes through the stator core 122, increases. Consequently, the inductance of the winding 121 decreases.

FIG. 4B shows a state after the inductance adjustment device 131 moves the stator core 122 in the direction of the arrow X1. The movement of the stator core 122 in the direction of the arrow X1 results in an increase of the magnetic resistance of the magnetic circuit F2 for the winding 121, which passes through the stator core 122. Consequently, the inductance of the winding 121 decreases.

The inductance adjustment device 131 changes the magnetic resistance of the air gap F2a whose magnetic resistance is highest. Thus, the inductance adjustment device 131 changes the magnetic resistance of the magnetic circuit F2 passing through the adjacent teeth 122b. This can cause a larger change of the inductance of the winding 121 as compared with, for example, changing the magnetic resistance of a portion other than the air gap F2a.

Furthermore, the inductance adjustment device 131 changes the inductance of the winding 121 such that the change rate of the inductance of the winding 121 is higher than the change rate of the magnetic flux linked with the winding 121. The inductance adjustment device 131 of the generator 10 according to this embodiment moves the position of the stator core 122 relative to the windings 121 while maintaining the position of the stator core 122 relative to the rotor 11.

As the inductance adjustment device 131 moves the stator core 122 in the direction of the arrow X1, the rotor 11 is accordingly moved in the direction of the arrow X1. Therefore, the position of the stator core 122 relative to the rotor 11 is maintained. This can suppress a change of the air gap length L1 between the teeth 122b and the magnetic pole parts 111, which otherwise might be caused by movement of the stator core 122. Accordingly, a change of the magnetic flux flowing from the magnetic pole part 111 to the stator core 122 is suppressed. That is, a change of the magnetic flux linked with the winding 121 is suppressed.

Under control of the inductance control device 153, the inductance adjustment device 131 switches the state of the generator 10 between the high-inductance state shown in FIG. 4A and the low-inductance state shown in FIG. 4B. The low-inductance state is a state in which the magnetic resistance of the magnetic circuit F2 for the winding 121, which passes through the stator core 122, is relatively high so that the inductance of the winding 121 is low. The high-inductance state is a state in which the magnetic resistance of the magnetic circuit F2 for the winding 121, which passes through the stator core 122, is relatively low so that the inductance of the winding 121 is high.

The low-inductance state corresponds to a certain range of inductance values. The high-inductance state corresponds to a certain range of inductance values. The inductance corresponding to the low-inductance state is lower than the inductance corresponding to the high-inductance state. The inductance range corresponding to the low-inductance state does not overlap the inductance range corresponding to the high-inductance state.

The inductance corresponding to the low-inductance state and the inductance corresponding to the high-inductance state are separated from each other by, for example, a boundary value. The boundary value is, for example, the median between the maximum and minimum inductance values obtainable under control of the inductance control device 153.

The inductance adjustment device 131 changes the inductance of the winding 121 such that the change rate of the inductance of the winding 121 is higher than the change rate of the magnetic flux linked with the winding 121. The inductance adjustment device 131 of the generator 10 according to this embodiment moves the position of the stator core 122 relative to the windings 121 while maintaining the position of the stator core 122 relative to the rotor 11.

As the inductance adjustment device 131 moves the stator core 122 in the direction of the arrow X1, the rotor 11 is accordingly moved in the direction of the arrow X1. Therefore, the position of the stator core 122 relative to the rotor 11 is maintained. This can suppress a change of the air gap length L1 between the teeth 122b and the magnetic pole parts 111, which otherwise might be caused by movement of the stator core 122. Accordingly, a change of the magnetic flux flowing from the magnetic pole part 111 to the stator core 122 is suppressed. That is, a change of the magnetic flux linked with the winding 121 is suppressed.

Figure 5A:
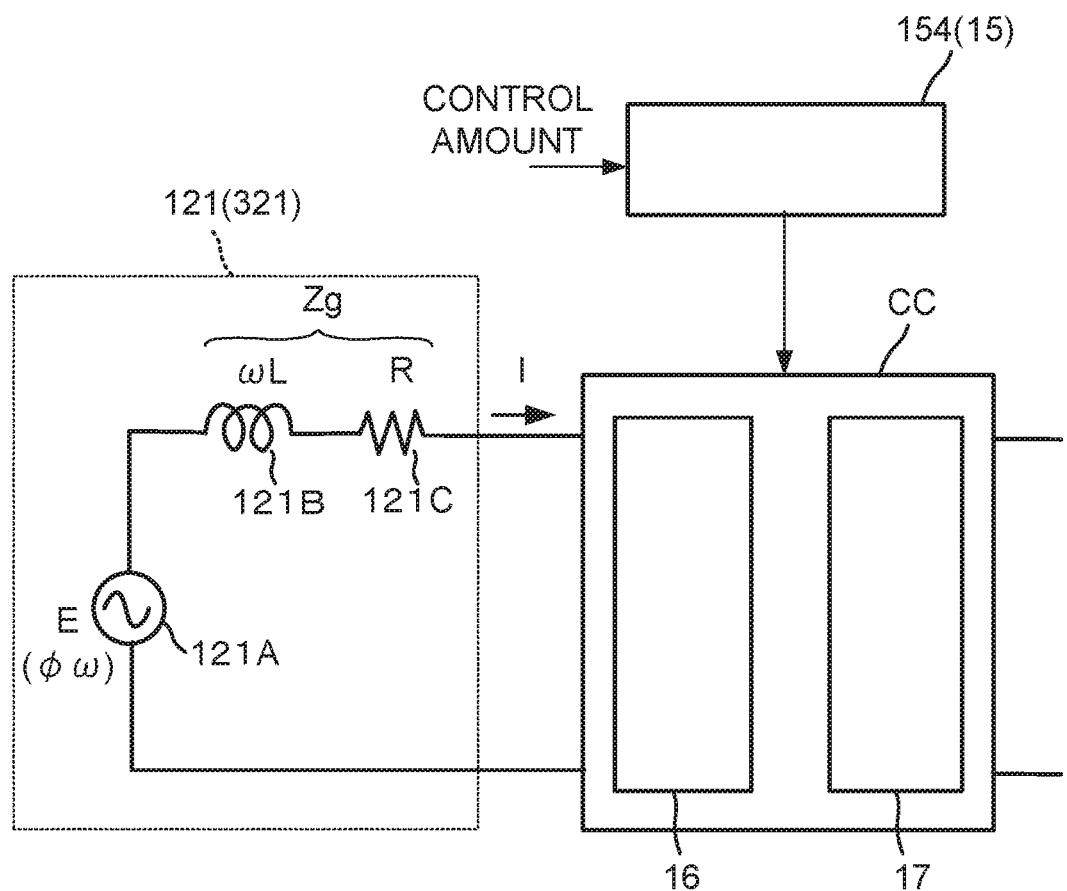
FIG. 5A is a circuit diagram schematically showing an equivalent circuit of a winding included in the generator shown in FIGS. 4A and 4B.

FIG. 5A is a circuit diagram schematically illustrating the winding 121 of the generator 10 shown in FIG. 4A and FIG. 4B.

In FIG. 5A, a circuit corresponding to one phase is illustrated in a simplified manner, for easy understanding of the function of the winding 121.

As shown in FIG. 5A, the winding 121 in an electrical sense includes an AC voltage source 121A, an inductor 121B, and a resistor 121C. The winding 121 is connected to the current adjustment device CC. The current adjustment device CC is under control of the current control device 154. The converter 16 of the current adjustment device CC rectifies the AC generated in the winding 121. The inverter 17 of the current adjustment device CC generates, from the rectified DC, a three-phase pulsed current adapted to rotation of the motor. A current I flowing from the converter 16 to the inverter 17 is illustrated as the current supplied from the generator 10 to the motor 18. The current I is a AC current.

Here, the current supplied from the generator 10 to the motor 18 can be obtained also by detection of the current supplied from the plurality of windings 121 of the generator 10 to the converter 16. The current supplied from the generator 10 to the motor 18 can be obtained also by detection of the current flowing from the inverter 17 to the windings of the motor 18.

The current adjustment device CC, under control of the current control device 154, adjusts the current I supplied from the generator 10 to the motor 18. The current I is controlled by one or both of the converter 16 and the inverter 17. The current control device 154 controls the current I supplied from the generator 10 to the motor 18, based on a control amount. The control amount includes the rotation speed of the engine 14 and the current I. The rotation speed of the engine 14 is obtained based on a detection result made by the rotation angle sensor 191. The current I is obtained based on a detection result made by the current sensor 192. The current control device 154 controls the current adjustment device CC in accordance with the control amount. Thus, the current control device 154 controls the current I supplied from the generator 10 to the motor 18.

Upon reception of a request for increasing the current, the current control device 154 adjusts the current outputted from the generator 10 such that a shortened time is required to increase the current outputted from the generator 10. The current control device 154 adjusts the current outputted from the generator 10 so as to minimize the time required to increase the current outputted from the generator 10. The current control device 154 performs a feedback control based on the amount of change of the rotation speed of the engine 14 and the amount of change of the output current of the generator 10. To be specific, the current control device 154 adjusts the current outputted from the generator 10 so as to increase the rotation speed of the engine 14 and increase the output current of the generator 10 (current increase mode).

For example, the current control device 154 repeatedly stores a current value that is based on a detection result made by the current sensor 192, and compares the previously stored values, to obtain the amount of change of the output current of the generator 10. The current control device 154 repeatedly stores a rotation speed value that is based on a detection result made by the rotation angle sensor 191, and compares the previously stored values, to obtain the amount of change of the rotation speed. If the rotation speed is increasing, the current control device 154 increases the target current to be outputted from the generator 10. The current control device 154 controls the amount of increase of the target current to be outputted from the generator 10, in accordance with the amount of increase of the rotation speed of the engine 14. For example, the larger the amount of increase of the rotation speed of the engine 14 is, the greater the degree to which the current control device 154 increases the target current to be outputted from the generator 10 is. If the amount of increase of the rotation speed of the engine 14 is small, the current control device 154 reduces the amount of increase of the target current. The current control device 154 directs the current adjustment device CC to adjust and set the current I to the target current. The current control device 154 controls the current outputted from the generator 10 by performing the feedback control based on the amount of change of the rotation speed of the engine 14. The current I varies according to the feedback control.

The current I flows in an electrical circuit including the winding 121 of the generator 10. The electrical circuit through which the current I flows includes the inductor 121B. When the current adjustment device CC changes the current I, the current I changes in accordance with response characteristics which are attributable to the inductor 121B.

Figure 5B:
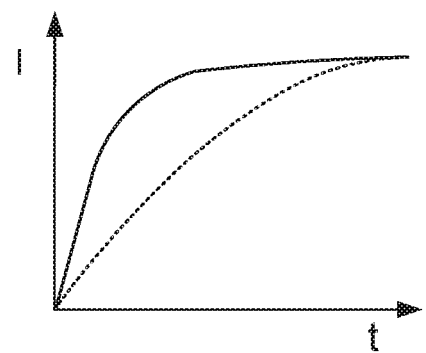
FIG. 5B is a graph showing exemplary response characteristics which are attributable to an inductor.

FIG. 5B is a graph showing exemplary response characteristics which are attributable to the inductor.

In the graph of FIG. 5B, the horizontal axis represents time. The vertical axis represents the current. The graph schematically shows an example of how the current changes over time when the circuit including the inductor is closed by the control. The solid line represents the change when the inductance is high. The broken line represents the change when the inductance is low.

As shown in the graph, it takes time for the current to reach a control target in response to the control of the current that flows in the circuit including the inductor. Thus, a response of the current to the control is delayed.

If a response of the current that flows in the circuit including the winding 121, which is shown in FIG. 5A, is delayed due to transient characteristics, an overshoot of the current is likely to occur during the control. That is, a situation in which the current transiently exceeds the target value is likely to occur. For example, as the current increases beyond the target value, the load torque of the generator 10 increases accordingly. When the increased load torque of the generator approaches the engine torque or exceeds the engine torque, the increase of the rotation speed of the engine is hindered. In addition, the excessive load torque of the generator 10 makes the rotation of the generator 10 unstable.

In this respect, a faster response of the current is obtained when the inductance is low, as represented by the solid line in the graph of FIG. 5B. The responsiveness of the current is high. This can suppress an overshoot of the current during the control.

The inductance adjustment device 131 moves the position of the stator core 122 relative to the winding 121. In this manner, the inductance adjustment device 131 changes the magnetic resistance of the magnetic circuit F2 for the winding 121, which passes through the stator core 122. This is how the inductance adjustment device 131 changes the inductance L of the winding 121.

In this embodiment, the responsiveness of the current to the current control is adjustable. Accordingly, an overshoot of the current during the current control can be suppressed.

The inductance adjustment device 131 changes the inductance of the winding 121 by changing the magnetic resistance of the air gap F2a existing between the winding 121 and the rotor 11. The magnetic pole parts 111 moving along with rotation of the rotor 11 cause an alternating magnetic field to occur between the windings 121 and the rotor 11. For example, reducing the magnetic resistance of the air gap F2a existing between the winding 121 and the rotor 11 leads to a reduction of an alternating magnetic field loss. To be exact, a core loss in the magnetic circuit F2 passing through the air gap F2a is reduced. The reduction of the loss lowers the load torque.

In this embodiment, a movement of the position of the stator core 122 relative to the winding 121 causes a change of the magnetic resistance of the magnetic circuit F2 for the winding 121, which passes through the stator core 122. The inductance L of the winding 121 is changed accordingly. This embodiment can gradually change the inductance L because the change of the inductance L is implemented by a change of the magnetic resistance of the magnetic circuit F2 for the winding 121, which passes through the stator core 122.

Instead of changing the magnetic resistance of the magnetic circuit for the winding which passes through the stator core, changing the substantial number of turns of the winding is also conceivable as a method for changing the inductance. For example, it is conceivable that a terminal provided at an end of the winding and a terminal provided in the middle of the winding are selectively switched for use as a current output terminal. It is also conceivable that a terminal provided in the middle of the winding is short-circuited to another terminal. This changes the substantial number of turns which affect the current. As a result, the inductance is changed.

Here, in a case of changing the substantial number of turns of the winding, such a change of the substantial number of turns is caused significantly and instantaneously. Therefore, an excessive voltage occurs in the winding. In addition, an excessive current is likely to flow in a short time. In a case of changing the substantial number of turns, it is required that a switching element for switching the current is provided. Furthermore, the switching element needs to have a high breakdown voltage in order to withstand the excessive voltage. The winding needs to be made of a thick wire in order to deal with a change of the excessive current. For these reasons, changing the substantial number of turns of the winding is less efficient. In addition, it involves a size increase of the generator.

In this embodiment, the magnetic resistance of the magnetic circuit F2 passing through the stator core 122 is changed, so that the inductance L of the winding 121 is changed. Thus, the inductance L of the winding 121 can be changed gradually. This can suppress a rapid increase of the voltage occurring in the winding 121. It is therefore possible that a component having a low breakdown voltage is connected to the generator 10. This provides a high efficiency. This also eliminates the need to provide the switching element for switching the current. This also allows use of a relatively thin wire for the winding. A size increase of the generator 10 is suppressed.

Figure 6:
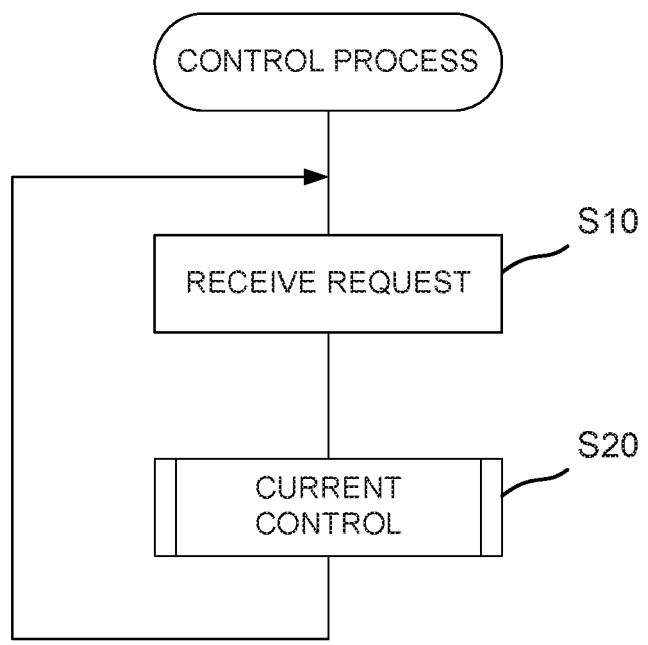
FIG. 6 is a flowchart of an operation of the vehicle.

FIG. 6 is a flowchart of an operation of the vehicle V.

The operation of the vehicle V is controlled by the control device 15 performing a control process. The control device 15 repeats the control process shown in FIG. 6. The control is described also with reference to FIG. 2.

The current request receiving device 151 of the control device 15 receives a current request (S10). To be exact, the current request receiving device 151 receives a signal representing the current request from the request indication device A. The current request receiving device 151 obtains the current request based on the amount of operation of the request indication device A. More specifically, the current request receiving device 151 obtains the current request based on the amount of operation of the request indication device A and the state of traveling of the vehicle V.

Then, the control device 15 performs the current control (S20). The control device 15 controls the current outputted from the generator 10 to the motor 18, based on the current request received by the current request receiving device 151. In more detail, the engine control device 152, the inductance control device 153, and the current control device 154 control the current.

Figure 7:
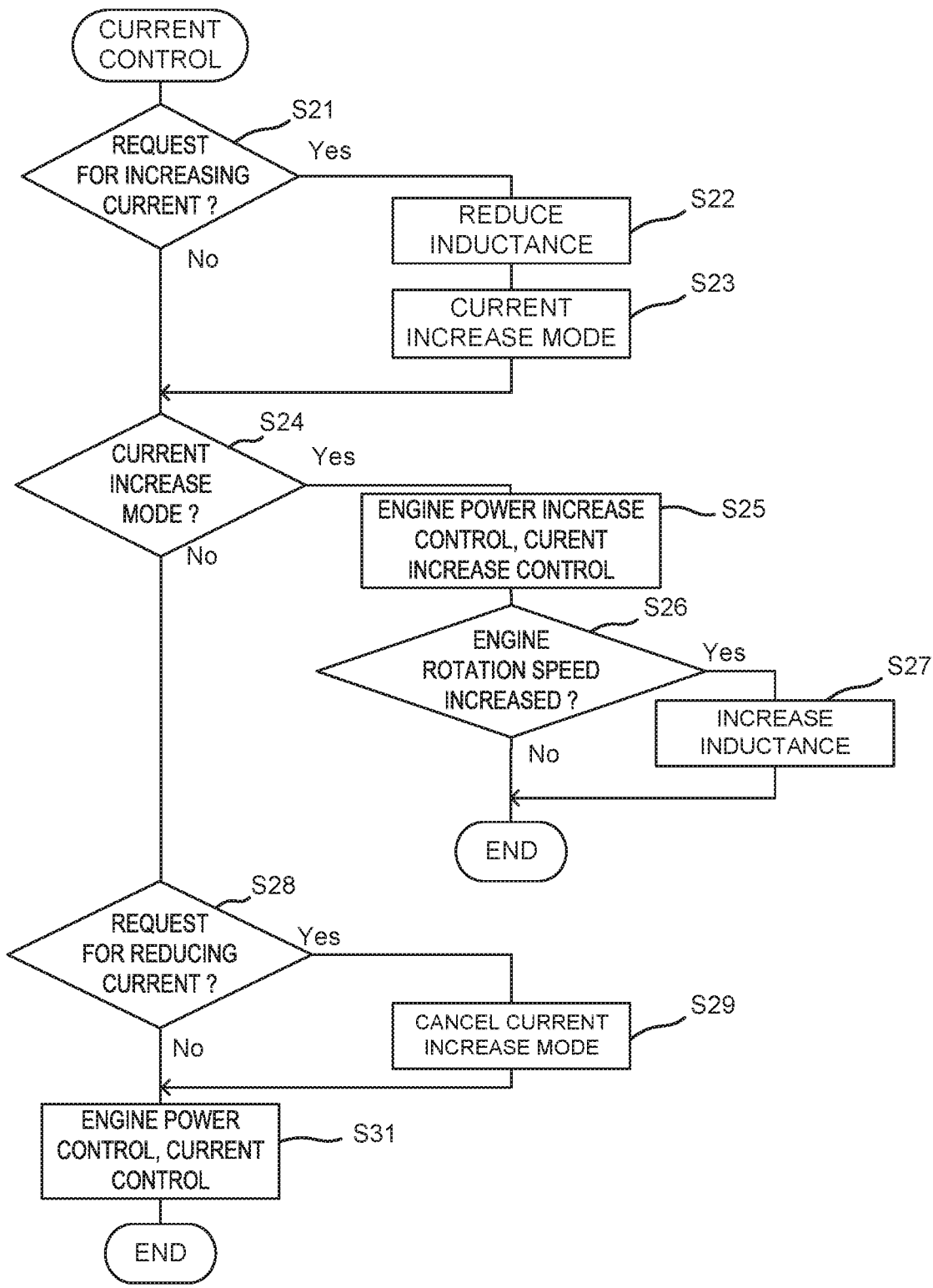
FIG. 7 is a flowchart of a current control shown in FIG. 6.

FIG. 7 is a flowchart of the current control shown in FIG. 6.

The control device 15 determines whether a request for increasing the current is received by the current request receiving device 151 (S21). The current request receiving device 151 identifies a request for increasing the current by, for example, comparing the current request with the previous current request. If no request for increasing the current is received (S21: No), the control device 15 performs processing of step S24.

If a request for increasing the current is received by the current request receiving device 151 (S21: Yes), the control device 15 reduces the inductance (S22). If a request for increasing the current, which corresponds to a request for increasing the torque, is received (S21: Yes), the control device 15 reduces the inductance (S22). The inductance control device 153 directs the inductance adjustment device 131 to reduce the inductance. The inductance control device 153 directs the inductance adjustment device 131 to increase the magnetic resistance of the magnetic circuit F2 for the winding 121, which passes through the stator core 122. In this manner, the inductance control device 153 directs the inductance adjustment device 131 to reduce the inductance of the winding 121 to a level lower than before the request for increasing the current is received.

Then, the control device 15 sets the control mode of the control device 15 to a current increase mode (S23). The current increase mode is a mode for increasing the current to be supplied to the motor 18.

Then, the control device 15 determines whether the control mode of the control device 15 is the current increase mode (S24).

If the control mode is the current increase mode (S24: Yes), the control device 15 performs an engine power increase control and a current increase control (S25). In more detail, the engine control device 152 directs the engine output adjustment device to increase the rotational power of the engine 14. As a result, the rotational power of the engine 14 is increased to a level higher than that of when the request for increasing the current was received.

Moreover, the current control device 154 directs the current adjustment device CC to adjust the current outputted from the generator 10. The current control device 154 performs the adjustment of the current outputted from the generator 10 such that a shortened time is required to increase the current outputted from the generator 10. The rate of increase of the current outputted from the generator 10 is, as mentioned above, influenced by the rate of increase of the rotation speed of the engine 14. To be specific, the current control device 154 directs the current adjustment device CC to adjust the current outputted from the generator 10 so as to increase the rotation speed of the engine 14 and increase the output current of the generator 10.

The current control device 154 controls the current by using the converter 16, for example. The current control device 154 performs the phase control on the converter 16, for controlling the current outputted from the generator 10. The current control device 154 performs the 120-degree conduction control on the inverter 17 without any PWM control.

In the above-described processing of steps S21 to S25, upon reception of the request for increasing the current, the engine control device 152, the inductance control device 153, and the current control device 154 included in the control device 15 perform the following control. The inductance control device 153 brings the generator 10 into the low-inductance state. That is, the inductance control device 153 brings the generator 10 into a state in which the magnetic resistance of the magnetic circuit for the winding, which passes through the stator core, is relatively high so that the inductance of the winding is low. Under this state, the engine control device 152 directs the engine output adjustment device 141 to increase the rotational power of the engine 14 to a level higher than when the request for increasing the current was received. In addition, the current control device 154 adjusts the current outputted from the generator 10 so as to increase the rotation speed of the engine 14 and increase the output current of the generator 10.

Then, the control device 15 determines whether the rotation speed of the engine has increased (S26). The control device 15 determines whether the rotation speed of the engine is at least higher than the rotation speed of the engine obtained when the request for increasing the current was received.

In step S26, more specifically, the control device 15 determines whether the rotation speed of the engine is higher than a predetermined value, to determine whether the rotation speed has increased. The predetermined value is set to a value higher than the rotation speed of the engine obtained when the request for increasing the current was received. Preferably, for example, the predetermined value is set to such a value that the rotation speed having that value makes the load torque of the generator 10 less influential to the stability of rotation of the engine 14. The predetermined value may be a fixed value. For example, the predetermined value may be a value corresponding to a predetermined percentage of the target value to which the rotation speed of the engine should be increased. It may be possible that, for example, the control device 15 determines whether the rotation speed of the engine has continuously increased over a predetermined period or longer, to determine whether the rotation speed has increased.

Upon determining that the rotation speed of the engine has increased (S26: Yes), the control device 15 brings the generator 10 into the high-inductance state. The control device 15 increases the inductance (S27). To be specific, the inductance control device 153 directs the inductance adjustment device 131 to increase the inductance. The inductance control device 153 directs the inductance adjustment device 131 to reduce the magnetic resistance of the magnetic circuit F2 for the winding 121, which passes through the stator core 122. In this manner, the inductance control device 153 directs the inductance adjustment device 131 to increase the inductance of the winding 121.

In this embodiment, the control device 15 directs the inductance adjustment device 131 to reduce the magnetic resistance of the magnetic circuit F2 for the winding 121, which passes through the stator core 122, while directing the current adjustment device CC to adjust the output current so as to increase the output current of the generator 10. The inductance control device 153 directs the inductance adjustment device 131 to increase the inductance of the winding 121 in this manner.

The control device 15 sets the rate of increasing the inductance in the step S27 to be lower than the rate of reducing the inductance in the step S22. In more details, the inductance control device 153 gradually increases the inductance over time at the step S27.

If the control mode is not the current increase mode (S24: No), the control device 15 determines whether a request for reducing the current is received (S28).

If no request for reducing the current is received (S28: No), the control device 15 performs the processing of step S31 which is described later. If a request for reducing the current is received (S28: Yes), the control device 15 cancels the setting of the current increase mode (S29). The control device 15 subsequently performs the processing of step S31.

Then, the control device 15 performs an engine power control and a current control (S31). The engine control device 152 directs the engine output adjustment device to adjust the rotational power of the engine in accordance with the current request. In addition, the current control device 154 directs the current adjustment device to adjust the current outputted from the generator in accordance with the current request.

For example, if a current requested by the current request is lower than a predetermined level, the engine control device 152 reduces the rotational power of the engine. In addition, the current control device 154 adjusts the current outputted from the generator 10.

Figure 8:
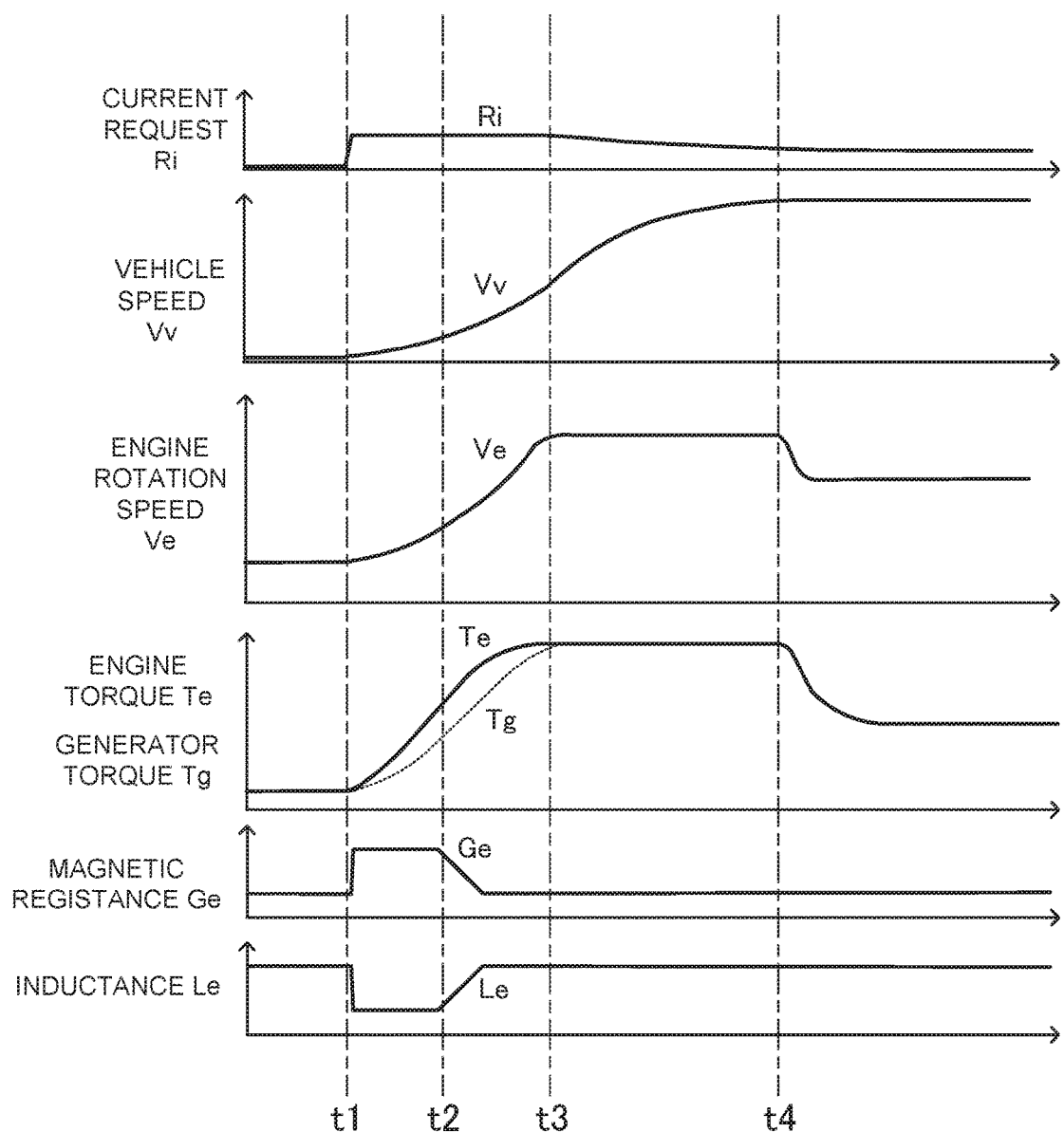
FIG. 8 illustrates graphs each showing an example of state transition of each part of the vehicle.

FIG. 8 depicts graphs each showing an example of state transition of each part of the vehicle V.

The horizontal axis of the graph represents time. Each graph shows the state of each part in a case of accelerating the vehicle V. To be precise, each graph shows an exemplary state in a situation where the vehicle V that has been stopped with the engine 14 rotating is starting up.

In a period before time t1, the vehicle V is stopped.

At the time t1, a request for increasing the current is received from the request indication device A. The request indication device A outputs the request for increasing the current. For example, the request indication device A is operated so that the request for increasing the current is received from the request indication device A.

Upon reception of the request for increasing the current, the inductance control device 153 of the control device 15 directs the inductance adjustment device 131 to bring the generator 10 into the low-inductance state. The inductance adjustment device 131 brings the generator 10 into the state in which the magnetic resistance of the magnetic circuit F2 for the winding 121, which passes through the stator core 122, is relatively high so that the inductance L of the winding 121 is low.

If the generator 10 is in the low-inductance state in the period before the time t1, the control device 15 performs a control such that the low-inductance state of the generator 10 is maintained after the time t1.

The control device 15 brings the generator 10 into the low-inductance state, and additionally directs the engine output adjustment device to increase the rotational power of the engine 14. After the time t1, an output torque Te of the engine 14 increases as the rotational power increases. The output torque Te of the engine gradually increases over time.

The control device 15 brings the generator 10 into the low-inductance state, and additionally directs the current adjustment device CC to adjust the output current of the generator 10.

A change of the output current of the generator 10 is similar to a change of a load torque Tg of the generator 10 shown in the graph of FIG. 8. The change of the load torque Tg of the generator represents the change of the output current of the generator 10.

The control device 15 directs the current adjustment device CC to adjust the output current of the generator 10 so as to increase a rotation speed Ve of the engine 14 and increase the output current of the generator 10. An increase of the rotation speed Ve of the engine 14 occurs on condition that the load torque Tg of the generator 10 is lower than the output torque Te of the engine 14. The control device 15, therefore, adjusts the output current of the generator 10 such that the load torque Tg of the generator 10 falls below the output torque Te of the engine 14. The control device 15 nevertheless increases the output current of the generator 10 over time.

As a result, after the request for increasing the current is received at the time t1, the rotation speed Ve of the engine increases while the output current of the generator 10 increases. The output current of the generator 10 is, in the graph of FIG. 8, represented by a waveform of the load torque Tg of the generator 10.

The control device 15 sets a control target of the output current of the generator 10 based on the change of the rotation speed Ve of the engine 14 and the change of the output current of the generator 10 (see the waveform of the load torque Tg). The control device 15 controls the current adjustment device CC such that the output current of the generator 10 reaches the set control target. In FIG. 8, the broken line indicating the load torque Tg of the generator represents an ideal change of the load torque in which the output current of the generator 10 increases in accordance with the control target.

While the output current of the generator 10 is changed by the control, an actual output current deviates from the target due to the transient characteristics of the circuit. The output current has an overshoot. For example, the output current deviates in a vibrating form. Thus, the actual load torque Tg of the generator 10 deviates, like vibrating up and down, from the ideal load torque represented by the broken line in FIG. 8.

An increase of the rotation speed Ve of the engine 14 is suppressed if, for example, the load torque Tg of the generator 10 approaches the output torque Te of the engine 14 or exceeds the output torque Te of the engine 14 as a result of the deviation of the output current from the control target. In this case, a required time to increase the rotation speed Ve of the engine 14 is prolonged. Consequently, a required time to increase the output current of the generator 10 is prolonged. That is, acceleration performance of the vehicle decreases. In addition, the rotation of the engine 14 becomes unstable.

Here, it is conceivable to, for example, lower the control target of the output current of the generator 10 for the purpose of ensuring a larger allowance of the output torque Te of the engine 14 relative to the load torque Tg of the generator 10. This keeps the output current of the generator 10 to a low level. As a result, a required time to increase the output current of the generator 10 is prolonged. That is, the acceleration performance of the vehicle is impaired.

This embodiment brings the generator 10 into the low-inductance state upon reception of a request for increasing the current. This achieves a fast response of the current to the current control. As a result, deviation of the output current due to the transient characteristics is suppressed. The load torque Tg of the generator 10 is likely to increase in accordance with the target represented by the broken line. The rotation of the engine 14 is stabilized. Moreover, occurrence of a situation is suppressed in which the load torque Tg of the generator 10 approaches the output torque Te of the engine 14 or exceeds the output torque Te of the engine 14. Accordingly, a required time to increase the output current of the generator 10 is shortened. This achieves improvement of the acceleration performance.

In this embodiment, furthermore, the current flowing from the generator to the motor is adjusted by on/off operation of the switching elements Sa, as described with reference to FIG. 3.

The current flowing in the winding 121 has transient characteristics with respect to on/off operation of the switching elements Sa, too. In other words, the current flowing in the winding 121 has a delay with respect to on/off operation of the switching elements Sa. For example, after the switching element Sa is turned on, the current flowing in the switching element Sa gradually increases. After the switching element Sa is turned off, the current flowing in the switching element Sa gradually decreases. A current component that flows in the switching element Sa with a delay causes a loss. As a result, power efficiency decreases. The loss caused by the delay is larger particularly when the PWM control is performed on the switching element Sa than when the PWM control is not performed thereon. Lowering the frequency of on/off operation leads to a reduction of the loss caused by the delay. Lowering the frequency, however, leads to an increase of audible noise.

In this embodiment, upon reception of a request for increasing the current, the generator 10 is adjusted into the state having a lower inductance. Since the inductance is low, the transient characteristics which are attributable to the inductance of the winding 121 are improved. Accordingly, a loss caused by a current component that flows in the switching element Sa with a delay can be suppressed. This enables the current to be supplied from the generator 10 to the motor with a high efficiency in response to the request for increasing the current.

At time t2, the rotation speed Ve of the engine 14 is higher than the rotation speed Ve obtained at the time (t1) when the request for increasing the current was received. Here, the control device 15 directs the inductance adjustment device 131 to bring the generator 10 into the high-inductance state. The inductance adjustment device 131 brings the generator 10 into the state in which the magnetic resistance of the magnetic circuit F2 for the winding 121, which passes through the stator core 122, is relatively low so that the inductance of the winding 121 is high.

At the time t2, the rotation speed Ve of the engine 14 is higher than the rotation speed Ve obtained when the request for increasing the current is received. Thus, the output torque Te of the engine 14 is higher than the output torque Te obtained when the request for increasing the current is received. Therefore, a change of the rotation speed of the engine 14 can be suppressed even if the load torque of the generator is changed by a high inductance Le. Accordingly, the current supplied from the generator 10 to the motor 18 can be increased by the high rotation speed with stabilized rotation of the engine 14.

At the time t2, the control device 15 sets the rate of increasing the inductance to be lower than the rate at which the inductance is reduced at the time t1. The control device 15 sets the rate of reducing the magnetic resistance of the magnetic circuit F2 for the winding 121, which passes through the stator core 122, to be lower than the rate at which the magnetic resistance is increased at the time t1. The control device 15 gradually reduces over time the magnetic resistance of the magnetic circuit F2 for the winding 121, which passes through the stator core 122. In this manner, the control device 15 gradually increases the inductance.

As the magnetic resistance F2 is reduced, the induced voltage of the winding 121 is likely to increase. That is, the current outputted from the generator 10 is likely to increase. The load torque of the generator 10 is likely to increase. A rapid increase of the induced voltage can be suppressed because the magnetic resistance is gradually reduced while the rotation speed Ve is higher than the rotation speed Ve obtained at the time (t1) when the request for increasing the current was received. In addition, a situation in which the rotation of the engine 14 becomes unstable can be suppressed.

Upon reception of a request for reducing the current at time t3, the control device 15 suppresses the increase of the rotational power of the engine 14. The increase of the output torque Te of the engine 14 is suppressed accordingly. Moreover, the output current of the generator 10 is controlled such that the rotation speed Ve of the engine is maintained. That is, the output current of the generator 10 is controlled such that the load torque Tg of the generator 10 can be balanced with the output torque Te of the engine 14.

If a requested current is lower than a predetermined level, the control device 15 reduces the rotational power of the engine 14 (t4). The output torque Te of the engine 14 decreases accordingly. As a result, the rotation speed Ve of the engine 14 decreases.

Each graph of FIG. 8 shows an exemplary state of each part in a situation where the vehicle V that has been stopped is starting up. The above-described operations are also applicable to a situation where the traveling vehicle V accelerates. If the control device 15 receives a request for increasing the current during traveling, the control device 15 reduces the inductance.

Second Embodiment

Next, a second embodiment of the present invention is described. In the description of the second embodiment given below, differences from the first embodiment illustrated above is mainly described.

Figure 9A:
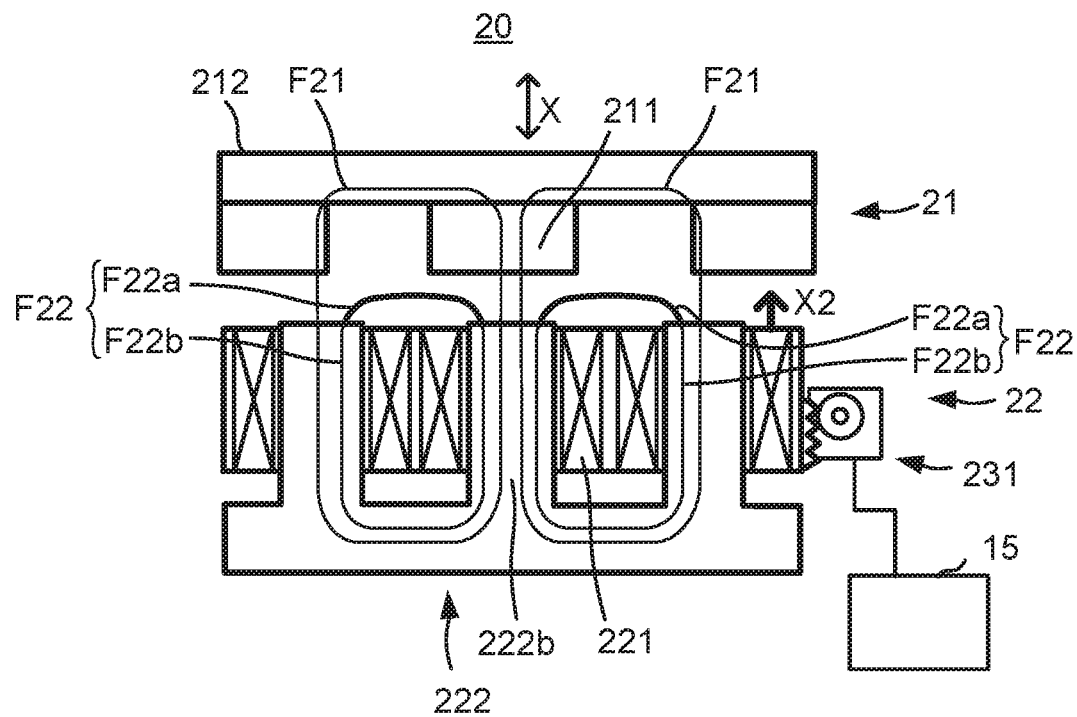
FIG. 9A is a schematic diagram showing a high-inductance state, for explanation of adjustment made by an inductance adjustment device included in a generator of a drive system according to a second embodiment.
Figure 9B:
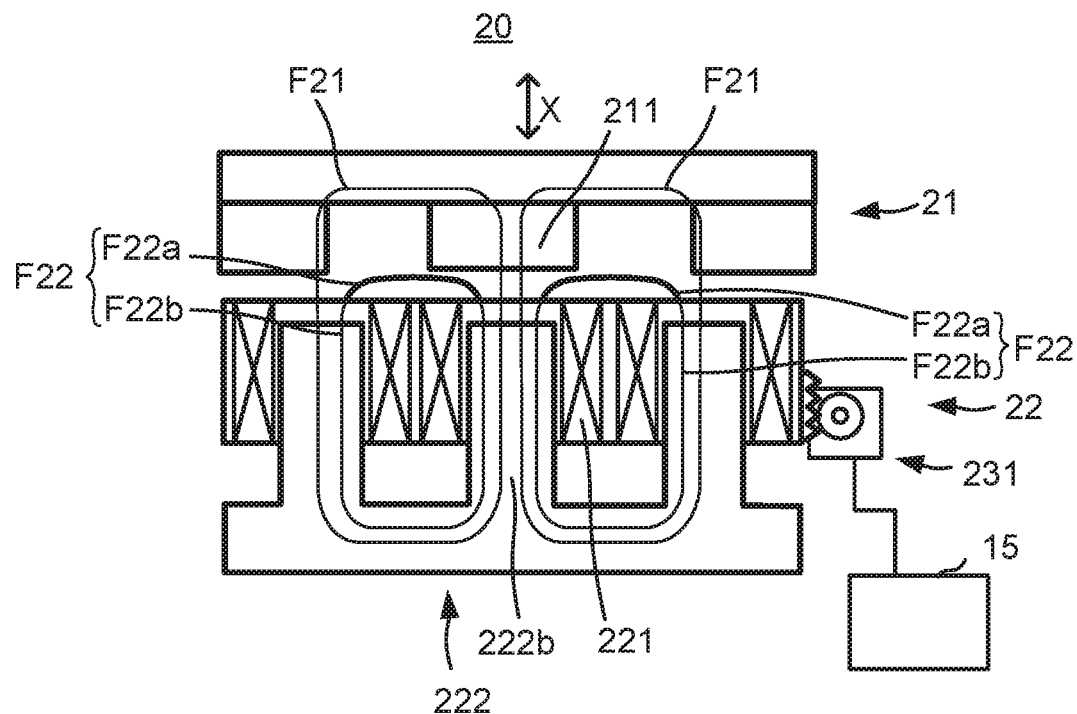
FIG. 9B is a schematic diagram showing a low-inductance state.

FIG. 9A and FIG. 9B are schematic diagrams for explanation of adjustment made by an inductance adjustment device provided in a generator 20 according to the second embodiment. FIG. 9A shows a state in which the inductance of the winding 121 is set to the highest settable value. FIG. 9B shows a state in which the inductance of the winding 121 is set to a value lower than that of FIG. 9A.

The positional relationship among windings 221, a stator core 222, and a rotor 21 shown in FIG. 9A is the same as the positional relationship thereamong in the first embodiment having been described with reference to FIG. 4A.

A magnetic circuit F21 is a magnetic circuit through which a magnetic flux generated by a magnetic pole part 211 flows. A magnetic circuit F22 is a magnetic circuit for the winding 221. The magnetic circuit F22 for the winding 221 is made up of a path passing through the inside of the winding 221 and providing the minimum magnetic resistance of the entire magnetic circuit F22. The magnetic circuit F22 passes through the stator core 222. The magnetic circuit F22 passes through two adjacent teeth 222b.

The magnetic circuit F22 passing through the stator core 222 includes an air gap F22a. The air gap F22a exists between the winding 221 and the rotor 21. The air gap F22a included in the magnetic circuit F22 exists between the winding 221 and the rotor 21 and between the two adjacent teeth 222b. The air gap F22a is a non-magnetic gap. The air gap F22a included in the magnetic circuit F22 is provided so as to connect respective portions of the two adjacent teeth 222b opposite to the rotor 21.

The magnetic circuit F22 for the winding 121, which does not pass through a back yoke part 212 of the rotor 21, includes the air gap F22a between the two adjacent teeth 122b.

In the state shown in FIG. 9A, the air gap F22a included in the magnetic circuit F22 has the highest magnetic resistance among portions of the magnetic circuit F22. The air gap F22a has a higher magnetic resistance than that of a remaining portion F22b of the magnetic circuit F22 other than the air gap F22a.

In the generator 20 shown in FIG. 9A, an inductance adjustment device 231 moves the winding 221 in accordance with a requested current. Thus, the inductance adjustment device 231 changes the magnetic resistance of the magnetic circuit F22 for the winding 221, which passes through the stator core 222. Thus, the inductance adjustment device 231 changes the inductance of the winding 221, to adjust the current to be supplied to the motor 18 (see FIG. 1).

The inductance adjustment device 231 moves the windings 221 without moving the stator core 222 of the stator 22.

More specifically, the stator core 222 is secured to a casing (not shown). The rotor 21 is rotatably supported on the casing. The rotor 21 is secured with respect to the axial direction X. The windings 221 are supported on the casing such that the windings 221 are freely movable in the axial direction X relative to the casing.

The inductance adjustment device 231 moves the windings 221 in such a direction that the teeth 222b come into and out of the cylindrical shapes of the windings 221. In this embodiment, the inductance adjustment device 231 moves the windings 221 in the axial direction X. The inductance adjustment device 231 moves the windings 221 in a direction indicated by the arrow X2, for example. The control device 15 operates the inductance adjustment device 231 in accordance with the current request.

FIG. 9B shows a state having a lower inductance than that of the state shown in FIG. 9A. The state shown in FIG. 9B is a state after the windings 221 are moved in the direction of the arrow X2.

In this embodiment, the inductance adjustment device 231 moves the windings 221 alone. All of the plurality of windings 221 wound on the plurality of teeth 222b are moved integrally. In this manner, the inductance adjustment device 231 moves the position of the stator core 222 relative to the windings 221. Thus, the inductance adjustment device 231 changes the magnetic resistance of the magnetic circuit F22 for the winding 221, which passes through the stator core 222.

For example, when the windings 221 are moved in the direction of the arrow X2, that is, toward the rotor 21, the teeth 222b of the stator core 222 are pulled out of the windings 221. Pulling the teeth 222b out of the windings 221 reduces the volume of the stator core 222 existing within the windings 221. As a result, the length of the air gap F22a included in the magnetic circuit F22 for the winding 221 increases. This increases the magnetic resistance of the air gap F22a between the winding 221 and the rotor 21. That is, the magnetic resistance of the air gap F22a, which has the highest magnetic resistance, is increased. As a result, the magnetic resistance of the magnetic circuit F22 for the winding 221 increases. Consequently, the inductance of the winding 221 decreases.

The inductance adjustment device 231 changes the magnetic resistance of the air gap F22a whose magnetic resistance is highest. Thus, the inductance adjustment device 231 changes the magnetic resistance of the magnetic circuit F22 passing through the adjacent teeth 222b. This can easily cause a larger change of the inductance of the winding 221 as compared with, for example, changing the magnetic resistance of the portion F22b other than the air gap F22a.

In this manner, the inductance adjustment device 231 changes the magnetic resistance of the magnetic circuit F22 for the winding 221. Thus, the inductance adjustment device 231 changes the inductance of the winding 221.

For example, the inductance adjustment device 231 increases the magnetic resistance of the magnetic circuit F22 passing through the stator core 222 when viewed from the winding 221 side, in accordance with a request for increasing the current. Thus, the inductance adjustment device 231 reduces the inductance of the winding 221.

The inductance adjustment device 231 changes the inductance of the winding 221 by changing the magnetic resistance of the air gap F22a existing between the winding 221 and the rotor 21. This results in a reduction of an alternating magnetic field loss. Accordingly, the current to be supplied to the motor 18 serving as the electrical load device can be adjusted to an increased degree.

Third Embodiment

Next, a third embodiment of the present invention is described. In the description of the third embodiment given below, differences from the first embodiment illustrated above are mainly described.

Figure 10:
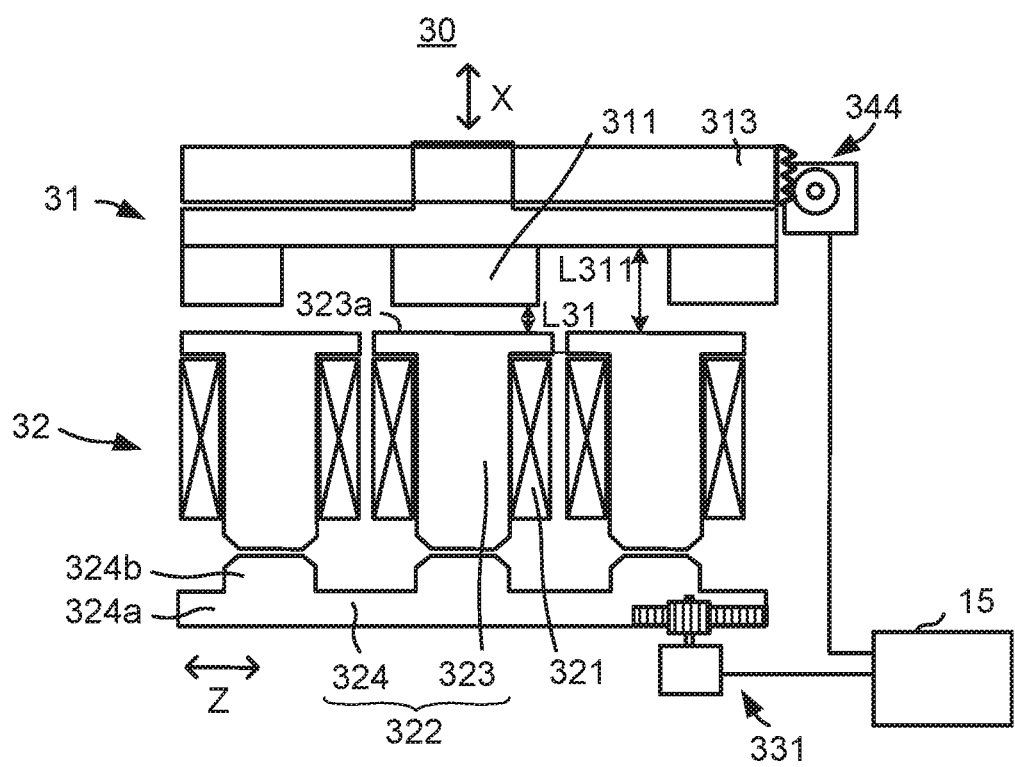
FIG. 10 is a schematic diagram showing a generator of a drive system according to a third embodiment.

FIG. 10 is a schematic diagram showing a generator 30 of a drive system according to the third embodiment.

A stator core 322 provided in the generator 30 shown in FIG. 10 includes a plurality of first stator core parts 323 and a second stator core part 324.

Each of the plurality of first stator core parts 323 is provided with a facing portion 323a that is opposite to the rotor 31 with an air gap therebetween. The plurality of first stator core parts 323 are annularly arranged at intervals. That is, the plurality of first stator core parts 323 align in the circumferential direction Z. The plurality of first stator core parts 323 function as primary teeth in the stator 32. In the specification herein, the first stator core parts 323 may also be referred to as first teeth 323. The length of the facing portion 323a of the first stator core part 323 with respect to the circumferential direction Z is longer than the length of any portion of the first stator core part 323 other than the facing portion 323a with respect to the circumferential direction Z. A winding 321 is wound on each of the first stator core parts 323.

The second stator core part 324 is arranged at a position opposite to the rotor 31 across the first stator core parts 323. The first stator core parts 323 are arranged between the second stator core part 324 and the rotor 31. The second stator core part 324 is not provided with the facing portion 323a that is opposite to the rotor 31. The second stator core part 324 includes a stator yoke portion 324a having an annular shape and a plurality of second teeth 324b. The second teeth 324b protrude from the stator yoke portion 324a toward the first stator core part 323. The number of the second teeth 324b is equal to the number of the first stator core parts 323. The stator yoke portion 324a and the second teeth 324b may be configured such that substantially all of the magnetic fluxes flowing through the second teeth 324b flow through the stator yoke portion 324a. That is, the second teeth 324b may be formed integral with the stator yoke portion 324a. Alternatively, the second teeth 324b may be formed separate from the stator yoke portion 324a such that they are attachable to the stator yoke portion 324a. The second teeth 324b are arranged so as to align in the circumferential direction Z. The plurality of second teeth 324b are annularly arranged at intervals equal to the intervals of the first stator core parts 323.

A inductance adjustment device 331 of the generator 30 of this embodiment moves the position of a part of the stator core 322 relative to the winding 321. The inductance adjustment device 331 moves one of the plurality of first stator core parts 323 and the second stator core part 324 relative to the other. Thus, the inductance adjustment device 331 changes the magnetic resistance for the winding 321. This is how the inductance adjustment device 331 adjusts the inductance.

The inductance adjustment device 331 is controlled by the control device 15. In more detail, the first stator core parts 323 are secured to a casing (not shown). The second stator core part 324 is supported so as to be rotatable in the circumferential direction Z. The inductance adjustment device 331 rotates the second stator core part 324 in the circumferential direction Z about the rotation axis of the rotor 31. In this manner, the inductance adjustment device 331 moves the second stator core part 324 from a first state (see FIG. 11A) to a second state (see FIG. 11B).

Figure 11A:
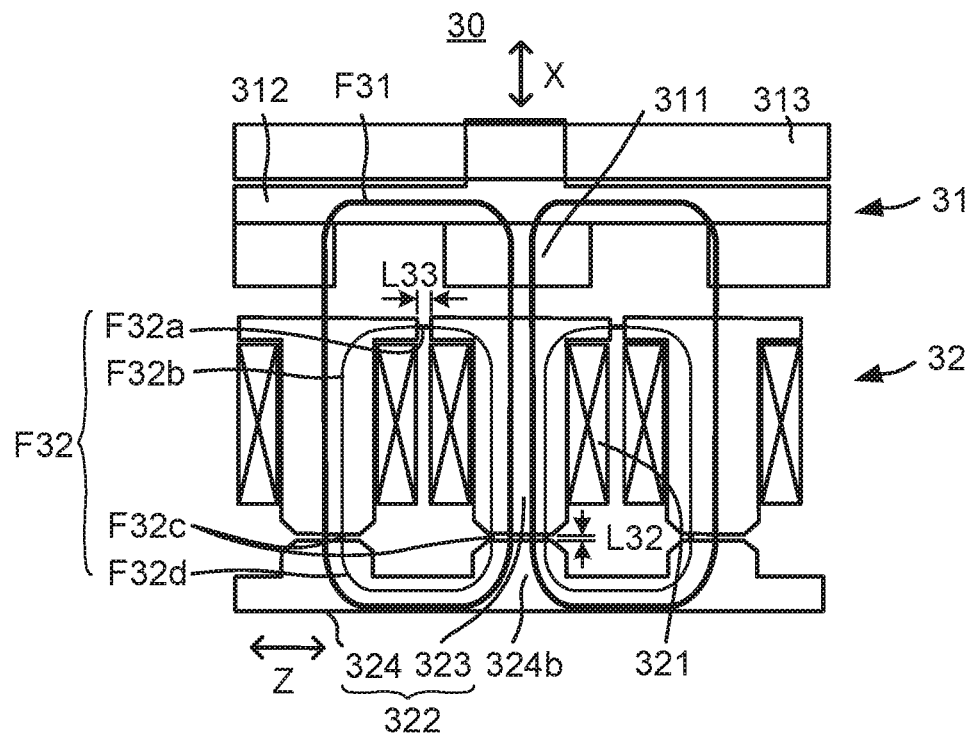
FIG. 11A is a schematic diagram showing a first state of a stator shown in FIG. 10.
Figure 11B:
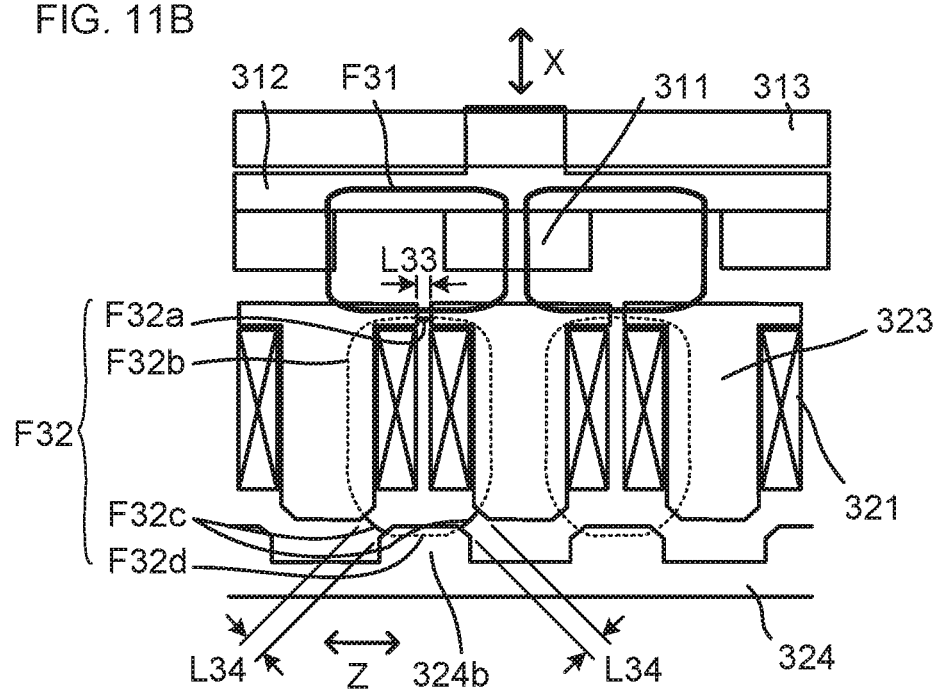
FIG. 11B is a schematic diagram showing a second state of the stator shown in FIG. 10.

FIG. 11A is a schematic diagram showing the first state of the stator 32 shown in FIG. 10. FIG. 11B is a schematic diagram showing the second state of the stator 32 shown in FIG. 10.

The first state shown in FIG. 11A is the high-inductance state.

In the state shown in FIG. 11A, the inductance of the winding 321 is set to the highest settable value. In the state shown in FIG. 11B, the inductance of the winding 321 is set to a value lower than that of FIG. 11A.

In the first state shown in FIG. 11A, each of the plurality of second teeth 324b is positioned with respect to the circumferential direction Z so as to confront each of the plurality of first stator core parts 323. In the first state, an air gap length L32 between each of the plurality of first stator core parts 323 and the second stator core part 324 is shorter than an air gap length L33 between adjacent ones of the plurality of first stator core parts 323. To be exact, the air gap length L33 is the length of an air gap formed between respective portions of the first stator core parts 323, each of the portions arranged between the winding 321 and the rotor 31 with respect to a direction in which the rotor 31 and the stator 32 are opposite to each other.

The second state shown in FIG. 11B is the low-inductance state.

In the second state shown in FIG. 11B, each of the plurality of second teeth 324b is positioned between adjacent ones of the first stator core parts 323 with respect to the circumferential direction Z. In the second state, an air gap length L34 between each of the plurality of first stator core parts 323 and the second stator core part 324 is longer than the air gap length L33 between adjacent ones of the plurality of first stator core parts 323.

Adjustment made by the inductance adjustment device 331 of the generator 30 according to the third embodiment is described.

FIG. 11A and FIG. 11B illustrate a magnetic circuit F31 through which a magnetic flux generated by a magnetic pole part 311 flows, and a magnetic circuit F32 for the winding 321. The magnetic circuit F32 for the winding 321 is made up of a path passing through the inside of the winding 321 and providing the minimum magnetic resistance of the entire magnetic circuit F32. The magnetic circuit F32 passes through the stator core 322. The magnetic circuit F32 passes through adjacent first stator core parts 323 (first teeth 323).

The magnetic circuit F32 includes three air gaps. A portion of the magnetic circuit F32 corresponding to an air gap between the two adjacent first stator core parts 323 (first teeth 323) is referred to as an air gap F32a. Portions of the magnetic circuit F32 corresponding to air gaps each between each of the two adjacent first stator core parts 323 (first teeth 323) and the second stator core part 324 are referred to as air gaps F32c. The air gap F32a between the two adjacent first stator core parts 323 (first teeth 323) exists between the winding 321 and the rotor 31. The air gap F32a included in the magnetic circuit F32 exists between the winding 321 and the rotor 31 and between the two adjacent first stator core parts 323 (first teeth 323). The air gap F32a is provided so as to connect mutually opposite end surfaces of the respective two adjacent first stator core parts 323 (first teeth 323).

In the first state shown in FIG. 11A, the air gap length L32 between each of the plurality of first stator core parts 323 (first teeth 323) and the second stator core part 324 is shorter than the air gap length L33 between adjacent ones of the plurality of first stator core parts 323 (first teeth 323). The air gap length L33 is the largest air gap length in the magnetic circuit F32. In the first state, therefore, the air gap F32a between the adjacent first stator core parts 323 has the highest magnetic resistance among portions of the magnetic circuit F32 for the winding 321. The magnetic resistance of the air gap F32a is higher than the magnetic resistance of any of remaining portions F32b, F32c, and F32d of the magnetic circuit F32 other than the air gap F32a. The magnetic resistance of the air gap F32a is higher than the magnetic resistance of the air gap F32c between the first stator core part 323 and the second stator core part 324.

The magnetic flux F32 generated by the current in the winding 321 flows through the adjacent first stator core parts 323 and the second stator core part 324, as shown in FIG. 11A. The magnetic resistance of the magnetic circuit F32 for the winding 321, which passes through the stator core 322, depends on the air gap length L33 between the adjacent first stator core parts 323.

The magnetic flux F31 generated by the magnetic pole part 311 flows through the two adjacent first stator core parts 323. The magnetic flux F31 flows through one magnetic pole part 311, a gap between the magnetic pole part 311 and the first stator core part 323, the first stator core part 323, the second stator core part 324, an adjacent first stator core part 323, a gap between the first stator core part 323 and the magnetic pole part 311, an adjacent magnetic pole part 311, and the back yoke part 312. In the first state shown in FIG. 11A, the magnetic flux F31 of the magnetic pole part 311 flows in the two adjacent first stator core parts 323 and the second stator core part 324.

In the second state shown in FIG. 11B, the air gap length L34 between each of the plurality of first stator core parts 323 and the second stator core part 324 is longer than the air gap length L33 between adjacent ones of the plurality of first stator core parts 323. Therefore, the magnetic resistance of the magnetic circuit F32 for the winding 321, which passes through the stator core 322, is strongly influenced by the air gap length L34 between the first stator core part 323 and the second stator core part 324. As a result, in the second state, the magnetic resistance of the magnetic circuit F32 for the winding 321, which passes through the stator core 322, is higher than the magnetic resistance in the first state.

The magnetic flux F31 generated by the magnetic pole part 311 flows through one magnetic pole part 311, the gap between the magnetic pole part 311 and the first stator core part 323, and the first stator core part 323. The magnetic flux F31 flows from the first stator core part 323 directly to the adjacent first stator core part 323. The magnetic flux F31 generated by the magnetic pole part 311 flows through a gap between the two adjacent first stator core parts 323. In the second state, the path of the magnetic flux F31 generated by the magnetic pole part 311 is switched in the above-described manner. In the second state, even if the path of the magnetic flux F31 is not switched, at least a portion of the magnetic flux F31 generated by the magnetic pole part 311 is increased, the portion flowing through the gap between the two adjacent first stator core parts 323. The increase of the portion of the magnetic flux F31 flowing through the gap between the two adjacent first stator core parts 323 leads to a substantial increase of the magnetic resistance of the air gap F32a. This is magnetically equivalent to an increase of the air gap length L33 between the two adjacent first stator core parts 323. Thus, the magnetic resistance of the magnetic circuit F32 including the air gap F32a is further increased. The change rate of the inductance of the winding 321 is higher than the change rate of the magnetic flux that is generated by the magnetic pole part 311 and linked with the winding 321.

As described above, the inductance of the winding 321 is liable to be in reverse proportion to the magnetic resistance for the winding 321. Therefore, the inductance of the winding 321 in the second state is lower than the inductance of the winding 321 in the first state.

The inductance adjustment device 331 moves one of the plurality of first stator core parts 323 and the second stator core part 324 relative to the other so as to shift from the first state (see FIG. 11A) to the second state (see FIG. 11B). In this manner, the inductance adjustment device 331 changes the magnetic resistance for the winding 321. Thus, the inductance adjustment device 331 changes the inductance of the winding 321.

The inductance adjustment device 331 changes the magnetic resistance of the air gap F32a. The inductance adjustment device 331 changes the magnetic resistance of the air gap F32a without changing the air gap length L33 between the first stator core parts 323 serving as the adjacent teeth. Thus, the inductance adjustment device 331 changes the magnetic resistance of the magnetic circuit F32 passing through the first stator core parts 323 serving as the adjacent teeth. In the first state, the air gap F32a has the highest magnetic resistance among portions of the magnetic circuit F32. This can provide a larger change of the inductance of the winding 321 than, for example, changing the magnetic resistance of portions other than the air gap F32a.

The inductance adjustment device 331 changes the inductance of the winding 321 by changing the magnetic resistance of the air gap F32a existing between the winding 321 and the rotor 31. This results in a reduction of an alternating magnetic field loss. Accordingly, the current to be supplied to the motor 18 serving as the electrical load device can be adjusted to an increased degree.

Referring to FIG. 10 again, a supply voltage adjustment device 344 of the generator 30 is described.

The generator 30 includes the supply voltage adjustment device 344 in addition to the inductance adjustment device 331. The supply voltage adjustment device 344 is under control of the control device 15.

The supply voltage adjustment device 344 changes a linkage flux flowing from the magnetic pole part 311 of the rotor 31 and linked with the winding 321. In this manner, the supply voltage adjustment device 344 changes the induced voltage E of the winding 321. This is how the supply voltage adjustment device 344 adjusts the voltage to be supplied to the motor 18. To be specific, the supply voltage adjustment device 344 moves the rotor 31 in the axial direction X. Thus, the supply voltage adjustment device 344 changes an air gap length L31 between the rotor 31 and the stator 32. Such a movement of the rotor 31 in the axial direction X is implemented by, for example, the supply voltage adjustment device 344 configured to move a bearing part 313 in the axial direction X, the bearing part 313 supporting the rotor 31 in a rotatable manner. The change of the air gap length L31 between the rotor 31 and the stator 32 leads to a change of the magnetic resistance between the rotor 31 and the stator 32. As a result, the amount of the magnetic flux generated by the magnetic pole part 311 and linked with the winding 321 is changed. The voltage generated by the generator 30 is changed accordingly.

In the third embodiment described above, the generator 30 includes both the inductance adjustment device 331 and the supply voltage adjustment device 344. The supply voltage adjustment device, however, is not indispensable in the drive system of the present invention.

The first stator core part 323, which is illustrated as an example of the first stator core part in the third embodiment above, has, in its end portion opposite to the rotor, protruding portions protruding in the circumferential direction Z which means the direction in which the first stator core parts are arranged side by side. It is however not always necessary that the first stator core part of the present invention includes the protruding portions.

Here, it is acceptable that the converter has a bridge circuit including diodes. That is, the converter may be configured as a rectifier. In such a case, the converter may include a regulator circuit capable of controlling the output current. The regulator circuit adjusts the current rectified by the rectifier, in accordance with a control performed by the control device. That is, the converter may be a rectifier regulator.

Alternatively, the converter may include a rectifier without including a regulator circuit. With such a configuration, the converter performs rectification alone, and does not control the current.

It is not always necessary that the engine output adjustment device of the present invention uses both the throttle valve adjustment mechanism and the fuel injection device, to adjust the rotational power. For example, the engine output adjustment device may adjust the rotational power by using one of the throttle valve adjustment mechanism and the fuel injection device. The engine output adjustment device in the present invention may be, for example, a valve arrangement that adjusts the flow rate of a gaseous fuel. The engine in the present invention may use a liquid fuel or a gaseous fuel.

In the embodiments described above, the vehicle V having four wheels is illustrated as an example. Applications of the present invention, however, are not limited thereto, and it may be applicable to a vehicle with three or fewer wheels, a vehicle with five or more wheels, and a vehicle with no wheel.

The present invention is applicable to, for example, a vehicle provided with wheels. The present invention is applicable to, for example, motorcycles, motor tricycles, buses, trucks, golf carts, carts, ATVs (All-Terrain Vehicles), ROVs (Recreational Off-highway Vehicles), and track-type vehicles.

The wheel is not the only example of the driving member. The driving member may be, for example, a propeller, an impeller, a caterpillar, or a track belt.

The present invention is applicable to, for example, industrial vehicles typified by forklifts, snow blowers, agricultural vehicles, military vehicles, snowmobiles, construction machines, small planing boats (water vehicles), marine crafts, outboard engines, inboard engines, airplanes, and helicopters.

In the embodiments described above, the rotor and the stator having an axial gap structure are illustrated as an example. The present invention is also applicable to a radial gap structure in which a rotor and a stator are opposite to each other with an air gap therebetween with respect to a radial direction. The axial direction X (FIGS. 4A and 4B) defined in the axial gap structure of these embodiments is one example of the direction in which the rotor and the stator of the present invention are opposite to each other. In the radial gap structure, the rotor and the stator are opposite to each other with respect to the radial direction.

In the embodiments described above, the generator including an SPM generator is illustrated as an example. Alternatively, the generator of the present invention may be an IPM (Interior Permanent Magnet) generator.

The air gap illustrated in the embodiments described above is one example of the non-magnetic gap. The non-magnetic gap is a gap made of a single type of a non-magnetic material or a plurality of types of non-magnetic materials. No particular limitation is put on the non-magnetic material. Examples of the non-magnetic material include air, aluminum, and resins. The non-magnetic gap includes at least an air gap.

In the embodiments described above, the configuration in which the rotor 11 is connected directly to the output shaft C of the engine 14 is illustrated as a specific example of the configuration in which the rotor 11 is connected to the engine 14. Here, the output shaft C of the engine 14 and the rotor 11 of the generator 10 may be connected with interposition of a transmission mechanism as typified by a belt, a gear, or a drive shaft.

In the embodiments described above, the accelerator operator is illustrated as an example of the request indication device A. Here, the current request of the present invention is not limited to the output of the accelerator operator. The following is some examples of the request indication device and the current request required by the request indication device:

a signal of requesting acceleration issued by an automatic speed control device (cruise control) of the vehicle; or an output of a switch and volume different from the accelerator operator, which is operated by the driver.

In the embodiments described above, the three-phase brushless motor is illustrated as an example of the motor. The motor of the present invention may be a motor having the same structure as that of the generator illustrated in the embodiments, including the structure of the inductance adjustment device. For example, like the generator 30, the motor may be structured so as to include the plurality of first stator core parts and the second stator core part and configured to move one of the first stator core parts and the second stator core part relative to the other.

The vehicle of the present invention may be provided with a battery that stores electric power generated by the generator. The generator may be operated by the electric power stored in the battery, to function as a starter of the engine.

In addition, for example, the motor of the vehicle may be operated by the electric power stored in the battery. Moreover, for example, both the generator and the battery may concurrently supply electric power to the motor, for operating the motor. It is nevertheless preferable to supply electric power from the generator to the motor, without providing any battery that supplies electric power for driving the motor. Such a configuration eliminates constraints on the engine rotation and the need of any control for protecting the battery, which otherwise might be necessary due to constraints on the battery voltage.

In the embodiments described above, the control device 15 constituted of a microcontroller is illustrated as an example of the control device. This, however, is not limiting the present invention. The control device may be constituted of a wired logic, for example.

All or part of the current request receiving device, the engine control device, the inductance control device, and the current control device may be provided as separate devices.

The change of the inductance of the winding is implemented by changing the magnetic resistance of the magnetic circuit for the winding, which passes through the stator core. The change of the magnetic resistance of the magnetic circuit for the winding, which passes through the stator core, may be implemented in a plurality of stages or in a single stage, or may be implemented continuously. In other words, the output current characteristics of the generator may be changed in a plurality of stages or in a single stage, or may be changed continuously. In the present invention, the magnetic resistance of the magnetic circuit for the winding, which passes through the stator core, may be changed in two stages.

The control device is configured to determine an output of the control device in accordance with an input to the control device. The control device is able to control both the engine output adjustment device and the inductance adjustment device by the central processing unit executing the program to perform the above-described operations. It may be possible that the program includes a map used for determining an output of the control device in accordance with an input to the control device. In the map, data about the input to the control device and data about the output of the control device are associated with each other. In such a configuration, the program causes the computer to refer to the map when the computer determines an output of the control device in accordance with an input to the control device.

It may not always be necessary that the control device adjusts the generator into the state in which the magnetic resistance of the magnetic circuit for the winding, which passes through the stator core, is relatively high so that the inductance is low, every time a request for increasing the current is received. For example, in a case of slow acceleration in which the current gently increases, the state may be maintained in which the magnetic resistance of the magnetic circuit for the winding, which passes through the stator core, is relatively low.

In the embodiments described above, the low-inductance state is a state in which the inductance of the winding is adjusted by the inductance control device to a value smaller than the boundary value (e.g., the median) between the maximum and minimum inductance values obtainable under control of the inductance control device 153. The high-inductance state is a state in which the inductance of the winding is adjusted by the inductance control device to a value greater than the boundary value. The magnetic resistance of the magnetic circuit for the winding, which passes through the stator core, in the low-inductance state is higher than the magnetic resistance of the magnetic circuit for the winding, which passes through the stator core, in the high-inductance state.

This example, however, is not limiting the low-inductance state and the high-inductance state in the present invention.

For example, the low-inductance state may be a state in which the inductance of the winding is adjusted by the inductance control device to a value smaller than the value of the inductance of the winding obtained at a time when a request for increasing the current was received. The high-inductance state may be a state in which the inductance of the winding is adjusted by the inductance control device to a value greater than the value of the inductance of the winding obtained at the time when the request for increasing the current was received. In other words, the boundary value may be the value of the inductance of the winding at the time when the request for increasing the current was received.

In the embodiments described above, the control device performs such a control that the inductance adjustment device adjusts the generator into the low-inductance state upon reception of a request for increasing the current, and then adjusts the generator into the high-inductance state if the rotation speed of the engine is higher than the rotation speed of the engine obtained when the request for increasing the current was received.

In the present invention, it may be also acceptable that the inductance adjustment device adjusts the generator into the low-inductance state, and then if the rotation speed of the engine is higher than the rotation speed of the engine obtained when the request for increasing the current was received, adjusts the inductance of the winding of the generator such that the inductance value rises from the minimum inductance value of the winding obtainable in the low-inductance state. In such a case, the adjustment of the inductance of the winding may be performed until the generator reaches the high-inductance state. The adjustment of the inductance of the winding may be performed when the generator is in the low-inductance state.

It should be understood that the terms and expressions used in the embodiments above are for descriptions and have no intention to be construed in a limited manner, do not eliminate any equivalents of features shown and mentioned herein, and allow various modifications falling within the claimed scope of the present invention. The present invention may be embodied in many different forms. The present disclosure is to be considered as providing examples of the principles of the invention. A number of illustrative embodiments are described herein with the understanding that such examples are not intended to limit the invention to preferred embodiments described herein and/or illustrated herein. The embodiments described herein are not limiting. The present invention includes any and all embodiments having equivalent elements, modifications, omissions, combinations, adaptations and/or alterations as would be appreciated by those in the art based on the present disclosure. The limitations in the claims are to be interpreted broadly based on the language employed in the claims and not limited to examples described in the present specification or during the prosecution of the application. The present invention should be interpreted broadly based on the language employed in the claims.

REFERENCE SIGNS LIST

V vehicle
Wc, Wd drive wheel
10, 20, 30 generator
11, 21, 31 rotor
12, 22, 32 stator
14 engine
15 control device
CC current adjustment device
16 converter
17 inverter
18 motor
131, 231, 331 inductance adjustment device
141 engine output adjustment device
323 first stator core part
324 second stator core part
344 supply voltage adjustment device

The invention claimed is:
1. A vehicle, comprising:
an engine configured to output rotational power;
a generator including
 a rotor, including a permanent magnet, configured to receive the rotational power from the engine,
 a stator arranged opposite to the rotor, and including a stator core with a winding wound thereon, the rotational power causing the rotor and the stator to generate a current for outputting by the generator, and
 an inductance adjustment device configured to change an inductance of the winding by changing magnetic resistance of a magnetic circuit for the winding, which passes through the stator core;
a motor configured to receive the current from the generator, the motor receiving no additional electric power from a battery;
a current adjustment device arranged between the generator and the motor, and configured to adjust the current outputted from the generator to the motor;
a driving member configured to be driven by the motor, to thereby drive the vehicle, the driving member receiving no rotational power from the engine; and
a control device configured to control the engine, the inductance adjustment device and the current adjustment device, by
 directing the inductance adjustment device to adjust the generator to operate in either a first state or a second state, the magnetic resistance of the magnetic circuit for the winding being higher in the first state than in the second state, the inductance of the winding being lower in the first state than in the second state, and
 upon receiving a request for increasing the current to be supplied to the motor,
  directing the inductance adjustment device to adjust the generator to operate in the first state,
  directing the engine to increase a rotation speed thereof to increase the rotational power, and
  directing the current adjustment device to increase the output current of the generator.
2. The vehicle according to claim 1, wherein
after receiving the request for increasing the current and increasing the rotation speed of the engine, the control device directs the inductance adjustment device to adjust the generator to operate in the second state.
3. The vehicle according to claim 2, wherein
the current adjustment device includes a switching element, and adjusts the current flowing from the generator to the motor by on/off operation of the switching element.
4. The vehicle according to claim 3, wherein
the magnetic circuit for the winding includes at least one non-magnetic gap between the winding and the rotor, and
the inductance adjustment device changes the inductance of the winding by changing magnetic resistance of the non-magnetic gap between the winding and the rotor.
5. The vehicle according to claim 4, wherein
the magnetic circuit for the winding, which passes through the stator core, includes the at least one non-magnetic gap, and
the inductance adjustment device changes the inductance of the winding, which is implemented by changing magnetic resistance of, among the at least one non-magnetic gap, the non-magnetic gap whose magnetic resistance is highest when the inductance of the winding is set to a highest settable value.
6. The vehicle according to claim 3, wherein
the magnetic circuit for the winding, which passes through the stator core, includes the at least one non-magnetic gap, and
the inductance adjustment device changes the inductance of the winding, which is implemented by changing magnetic resistance of, among the at least one non-magnetic gap, the non-magnetic gap whose magnetic resistance is highest when the inductance of the winding is set to a highest settable value.
7. The vehicle according to claim 2, wherein
the magnetic circuit for the winding includes at least one non-magnetic gap between the winding and the rotor, and
the inductance adjustment device changes the inductance of the winding by changing magnetic resistance of the non-magnetic gap between the winding and the rotor.
8. The vehicle according to claim 7, wherein
the magnetic circuit for the winding, which passes through the stator core, includes the at least one non-magnetic gap, and
the inductance adjustment device changes the inductance of the winding, which is implemented by changing magnetic resistance of, among the at least one non-magnetic gap, the non-magnetic gap whose magnetic resistance is highest when the inductance of the winding is set to a highest settable value.
9. The vehicle according to claim 2, wherein
the magnetic circuit for the winding, which passes through the stator core, includes at least one non-magnetic gap, and
the inductance adjustment device changes the inductance of the winding, which is implemented by changing magnetic resistance of, among the at least one non-magnetic gap, the non-magnetic gap whose magnetic resistance is highest when the inductance of the winding is set to a highest settable value.

10. The vehicle according to claim 1, wherein
the current adjustment device includes a switching element, and adjusts the current flowing from the generator to the motor by on/off operation of the switching element.

11. The vehicle according to claim 10, wherein
the magnetic circuit for the winding includes at least one non-magnetic gap between the winding and the rotor, and
the inductance adjustment device changes the inductance of the winding by changing magnetic resistance of the non-magnetic gap between the winding and the rotor.

12. The vehicle according to claim 11, wherein
the magnetic circuit for the winding, which passes through the stator core, includes the at least one non-magnetic gap, and
the inductance adjustment device changes the inductance of the winding, which is implemented by changing magnetic resistance of, among the at least one non-magnetic gap, the non-magnetic gap whose magnetic resistance is highest when the inductance of the winding is set to a highest settable value.

13. The vehicle according to claim 10, wherein
the magnetic circuit for the winding, which passes through the stator core, includes at least one non-magnetic gap, and
the inductance adjustment device changes the inductance of the winding, which is implemented by changing magnetic resistance of, among the at least one non-magnetic gap, the non-magnetic gap whose magnetic resistance is highest when the inductance of the winding is set to a highest settable value.

14. The vehicle according to claim 1, wherein
the magnetic circuit for the winding includes at least one non-magnetic gap between the winding and the rotor, and
the inductance adjustment device changes the inductance of the winding by changing magnetic resistance of the non-magnetic gap between the winding and the rotor.

15. The vehicle according to claim 14, wherein
the magnetic circuit for the winding, which passes through the stator core, includes the at least one non-magnetic gap, and
the inductance adjustment device changes the inductance of the winding, which is implemented by changing magnetic resistance of, among the at least one non-magnetic gap, the non-magnetic gap whose magnetic resistance is highest when the inductance of the winding is set to a highest settable value.

16. The vehicle according to claim 1, wherein
the magnetic circuit for the winding, which passes through the stator core, includes at least one non-magnetic gap, and
the inductance adjustment device changes the inductance of the winding, which is implemented by changing magnetic resistance of, among the at least one non-magnetic gap, the non-magnetic gap whose magnetic resistance is highest when the inductance of the winding is set to a highest settable value.

17. The vehicle according to claim 1, wherein
a magnetic flux forms in the rotor and is linked with the winding, the magnetic flux changing, at a first change rate, as the rotor rotates, and
the inductance adjustment device changes the inductance of the winding at a second change rate that is higher than the first change rate.

18. The vehicle according to claim 1, wherein the inductance adjustment device is controlled by the control device to move at least a portion of the stator core relative to the winding, to thereby change the magnetic resistance of the magnetic circuit for the winding.

19. The vehicle according to claim 18, wherein the inductance adjustment device causes the portion of the stator core to move relative to the winding while maintaining a position of the stator core relative to the rotor.

20. The vehicle according to claim 1, wherein the inductance adjustment device is controlled by the control device to move the winding, to thereby change the magnetic resistance of the magnetic circuit for the winding.

21. The vehicle according to claim 1, wherein
the stator core includes a plurality of first stator core parts, each having a facing portion that is opposite to the rotor with a non-magnetic gap therebetween, and a second stator core part, and
the inductance adjustment device changes the magnetic resistance of the magnetic circuit for the winding by moving one, relative to the other, of the plurality of first stator core parts and the second stator core part.

22. The vehicle according to claim 21, wherein the move of one of the plurality of first stator core parts and the second stator core part relative to the other causes a state of the stator to shift from
the first state, in which a width of a non-magnetic gap between each of the plurality of first stator core parts and the second stator core part is smaller than a width of a non-magnetic gap between adjacent ones of the plurality of first stator core parts to
the second state in which the width of the non-magnetic gap between each of the plurality of first stator core parts and the second stator core part is larger than the width of the non-magnetic gap between adjacent ones of the plurality of first stator core parts.

* * * * *